United States Patent
Watanabe et al.

(10) Patent No.: US 11,774,398 B2
(45) Date of Patent: Oct. 3, 2023

(54) SENSOR ELEMENT AND GAS SENSOR

(71) Applicant: NGK INSULATORS, LTD., Aichi (JP)

(72) Inventors: Yusuke Watanabe, Nagoya (JP); Takayuki Sekiya, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 324 days.

(21) Appl. No.: 17/192,070

(22) Filed: Mar. 4, 2021

(65) Prior Publication Data
US 2021/0302354 A1 Sep. 30, 2021

(30) Foreign Application Priority Data
Mar. 25, 2020 (JP) ................................. 2020-055077

(51) Int. Cl.
G01N 27/407 (2006.01)
G01N 27/409 (2006.01)
G01N 27/417 (2006.01)

(52) U.S. Cl.
CPC ....... G01N 27/4071 (2013.01); G01N 27/409 (2013.01); G01N 27/4076 (2013.01); G01N 27/417 (2013.01)

(58) Field of Classification Search
CPC ............. G01N 27/409; G01N 27/4071; G01N 27/4076; G01N 27/4072; G01N 27/417
See application file for complete search history.

(56) References Cited

U.S. PATENT DOCUMENTS

2005/0252770 A1* 11/2005 Naito ................. G01N 27/4071
  204/427
2013/0019655 A1* 1/2013 Nakagawa ........... G01N 27/419
  73/31.05
(Continued)

FOREIGN PATENT DOCUMENTS

JP  2007-33464 A  2/2007
JP  2013-40922 A  2/2013
(Continued)

OTHER PUBLICATIONS

Japanese Office Action received in corresponding Japanese Application No. 2020-055077 dated Jul. 11, 2023.

Primary Examiner — Benjamin R Schmitt
(74) Attorney, Agent, or Firm — MATTINGLY & MALUR, PC

(57) ABSTRACT

A sensor element for detecting a specific gas concentration in a measurement-object gas includes: an element body including an oxygen-ion-conductive solid electrolyte layer, and having inside a measurement-object gas flow portion that introduces and flows a measurement-object gas and a reference gas chamber used to store a reference gas that is a reference for detecting a specific gas concentration; a reference electrode disposed in the reference gas chamber; and an electrically conductive portion which includes a reference electrode terminal and a reference electrode lead portion that provides electrical continuity between the reference electrode terminal and the reference electrode. The reference gas chamber is provided inside the sensor element in an isolated form, and at least part of the electrically conductive portion is densely formed so as to block movement of oxygen between the reference gas chamber and the outside of the sensor element via the electrically conductive portion.

8 Claims, 9 Drawing Sheets

(56) References Cited

U.S. PATENT DOCUMENTS

2014/0190828 A1* 7/2014 Kamada ............ G01N 27/4078
204/427
2015/0276659 A1 10/2015 Sekiya et al.

FOREIGN PATENT DOCUMENTS

| JP | 2014-55859 A | 3/2014 |
| JP | 2015-200643 A | 11/2015 |

* cited by examiner

SENSOR ELEMENT AND GAS SENSOR

CROSS-REFERENCE TO RELATED APPLICATION

The application claims the benefit of Japanese Patent Application No. 2020-055077 filed Mar. 25, 2020, which is hereby incorporated by reference herein in its entirety.

BACKGROUND OF THE INVENTION

1. Field of the Invention

The present invention relates to a sensor element and a gas sensor.

2. Description of the Related Art

Hitherto, a gas sensor that detects the concentration of a specific gas, such as NOx, in a measurement-object gas, such as the exhaust gas of an automobile, is known. For example, Patent Literature 1 describes a gas sensor including a long planar-shaped sensor element made up of a plurality of laminated oxygen-ion-conductive solid electrolyte layers.

FIG. 12 is a schematic cross-sectional view schematically showing an example of the configuration of a gas sensor 900 of such an existing example. As shown in the drawing, the gas sensor 900 includes a sensor element 907. The sensor element 907 is an element having a structure in which dense, oxygen-ion-conductive solid electrolyte layers 901 to 906 are laminated. In the sensor element 907, a measurement-object gas flow portion that introduces measurement-object gas is formed between the under surface of the solid electrolyte layer 906 and the top surface of the solid electrolyte layer 904, and a measurement electrode 944 is formed in the measurement-object gas flow portion. An outer pump electrode 923 is formed on the top surface of the solid electrolyte layer 906. On the other hand, a reference gas inlet space 943 that introduces reference gas (for example, air) that is a reference for detecting a specific gas concentration in measurement-object gas is formed between the top surface of the solid electrolyte layer 903 and the under surface of the solid electrolyte layer 905. A reference electrode 942 is formed on the top surface of the solid electrolyte layer 903, facing the reference gas inlet space 943. The reference electrode 942 is coated with a porous reference gas inlet layer 948. Reference gas is introduced to the reference electrode 942 from the outside of the sensor element 907 through the reference gas inlet space 943 and the reference gas inlet layer 948. With this gas sensor 900, when measurement-object gas is introduced into the measurement-object gas flow portion, an electromotive force Va is generated between the measurement electrode 944 and the reference electrode 942. Oxygen is pumped out or pumped in through the outer pump electrode 923 and the measurement electrode 944 in accordance with the electromotive force Va. A specific gas concentration in the measurement-object gas is detected in accordance with a current Ip2 at the time of pumping out or pumping in. The gas sensor 900 includes a reference gas adjustment device that pumps oxygen into around the reference electrode 942 by passing a pump current Ip3 between the reference electrode 942 and the outer pump electrode 923. The reference gas adjustment device pumps oxygen into around the reference electrode 942 to make it possible to compensate for a decrease in oxygen concentration of reference gas around the reference electrode 942, so it is possible to suppress a decrease in the detection accuracy of the specific gas concentration. The case where the oxygen concentration of reference gas around the reference electrode 942 decreases is, for example, a case where measurement-object gas slightly enters the reference gas inlet space 943.

CITATION LIST

Patent Literature

PTL 1: Japanese Unexamined Patent Application Publication No. 2015-200643

SUMMARY OF THE INVENTION

However, since the outside of the sensor element and the reference electrode communicate with each other via the reference gas inlet space and the reference gas inlet layer, it is not possible to completely eliminate a decrease in oxygen concentration around the reference electrode due to the influence of the atmosphere outside the sensor element. Even when the reference gas adjustment device pumps oxygen into around the reference electrode as described above, there have been cases where the amount of oxygen pumped in is too large or too small. For this reason, it has been desired to further suppress a change in oxygen concentration around the reference electrode.

The present invention is made to solve such inconvenience, and it is a main object to further suppress a change in oxygen concentration around a reference electrode.

The present invention employs the following manner to achieve the above-described main object.

A sensor element of the present invention is a sensor element for detecting a specific gas concentration in a measurement-object gas. The sensor element includes: an element body including an oxygen-ion-conductive solid electrolyte layer, and having inside a measurement-object gas flow portion that introduces and flows the measurement-object gas and a reference gas chamber used to store a reference gas that is a reference for detecting the specific gas concentration; a reference electrode disposed in the reference gas chamber; and an electrically conductive portion including a reference electrode terminal disposed on an outer side of the element body and a reference electrode lead portion that provides electrical continuity between the reference electrode terminal and the reference electrode. The reference gas chamber is provided inside the element body in an isolated form so as not to communicate with an outside of the element body or the measurement-object gas flow portion. At least part of the electrically conductive portion is densely formed so as to block movement of oxygen between the reference gas chamber and the outside of the element body via the electrically conductive portion.

With this sensor element, the reference gas chamber is provided inside the element body in an isolated form so as not to communicate with the outside of the element body or the measurement-object gas flow portion, and the reference electrode is disposed in the reference gas chamber. At least part of the electrically conductive portion connected to the reference electrode is densely formed so as to block movement of oxygen between the reference gas chamber and the outside of the element body via the electrically conductive portion. With this configuration, entry and exit of oxygen between the inside and outside of the reference gas chamber are suppressed, so a change in the oxygen concentration around the reference electrode is further suppressed. In this case, the reference electrode may be porous. The term "porous" means that the porosity exceeds 5%.

The sensor element of the present invention may include a dense layer covering at least part of a portion made up of the solid electrolyte layer on an inner peripheral surface of the reference gas chamber and having no oxygen ion conductivity. Here, an oxygen-ion-conductive solid electrolyte may ionize and conduct oxygen therearound even when no voltage is applied. For this reason, if there is an exposed portion of the solid electrolyte layer on the inner peripheral surface of the reference gas chamber, oxygen may slightly flow out from the reference gas chamber via the exposed portion. In contrast, since the dense layer having no oxygen ion conductivity covers at least part of a portion made up of the solid electrolyte layer on the inner peripheral surface of the reference gas chamber, an exposed area of the solid electrolyte is reduced, so outflow of oxygen from the reference gas chamber via the solid electrolyte is suppressed. Therefore, a change in oxygen concentration around the reference electrode is further suppressed. Here, the term "dense" means that a porosity is lower than or equal to 5%. In this case, the dense layer preferably covers 80% or higher of the exposed area of the solid electrolyte on the inner peripheral surface of the reference gas chamber, and more preferably covers 100%.

In the sensor element of the present invention in the aspect including the dense layer, a spatial volume in the reference gas chamber may be greater than or equal to 0.106 $mm^3$. With this configuration, a change in oxygen concentration in the reference gas chamber in a case where oxygen in the reference gas chamber flows out is small, so a change in oxygen concentration around the reference electrode is further suppressed. Here, it is defined that the term "spatial volume" includes the volume of pores of a porous object in the reference gas chamber and does not include the volume of pores of a dense object (for example, dense layer). When, for example, the reference electrode is porous, the volume of pores in the reference electrode is also included in the "spatial volume".

The sensor element of the present invention may include a porous body filled in the reference gas chamber and having no oxygen ion conductivity. With this configuration, even when there is a portion made up of a solid electrolyte layer on the inner peripheral surface of the reference gas chamber, the exposed area of the solid electrolyte is reduced by using the porous body, so outflow of oxygen from the reference gas chamber via the solid electrolyte is suppressed. Since pores inside the porous body function as space for storing reference gas, a spatial volume in the reference gas chamber is ensured. With this configuration, a change in oxygen concentration around the reference electrode is further suppressed.

In the sensor element of the present invention in the aspect including the porous body, a spatial volume in the reference gas chamber may be greater than or equal to 0.026 $mm^3$. With this configuration, a change in oxygen concentration in the reference gas chamber in a case where oxygen in the reference gas chamber flows out is small, so a change in oxygen concentration around the reference electrode is further suppressed. In this case, a spatial volume in the reference gas chamber may be greater than or equal to 0.164 $mm^3$. With this configuration, a change in oxygen concentration in the reference gas chamber in a case where oxygen in the reference gas chamber flows out is further small, so a change in oxygen concentration around the reference electrode is further suppressed.

In the sensor element of the present invention in the aspect including the porous body, a porosity of the porous body may be higher than or equal to 20% and lower than or equal to 30%.

The sensor element of the present invention may include an outer electrode provided on an outer side of the element body so as to contact with the measurement-object gas, and a measurement electrode disposed in the measurement-object gas flow portion.

A gas sensor of the present invention includes the sensor element of any one of the above-described aspects. Therefore, with the gas sensor, similar advantageous effects to those of the above-described sensor element of the present invention, for example, an advantageous effect that a change in oxygen concentration around the reference electrode is further suppressed, are obtained.

The gas sensor of the present invention may include a detection device that detects the specific gas concentration in the measurement-object gas in accordance with a voltage between the reference electrode and the measurement electrode.

DETAILED DESCRIPTION OF THE INVENTION

Figure 1:
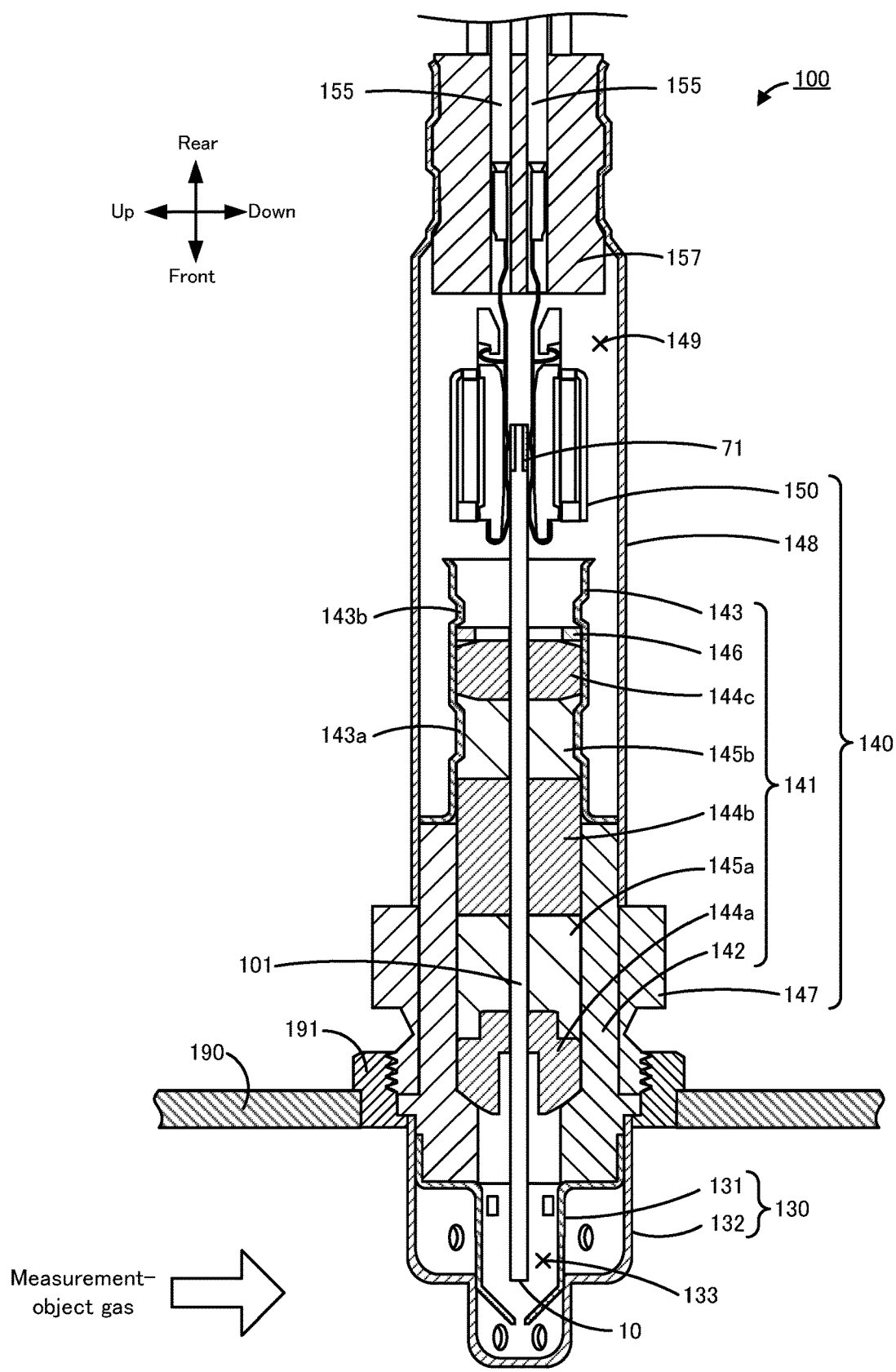
FIG. 1 is a longitudinal sectional view of a gas sensor 100.
Figure 2:
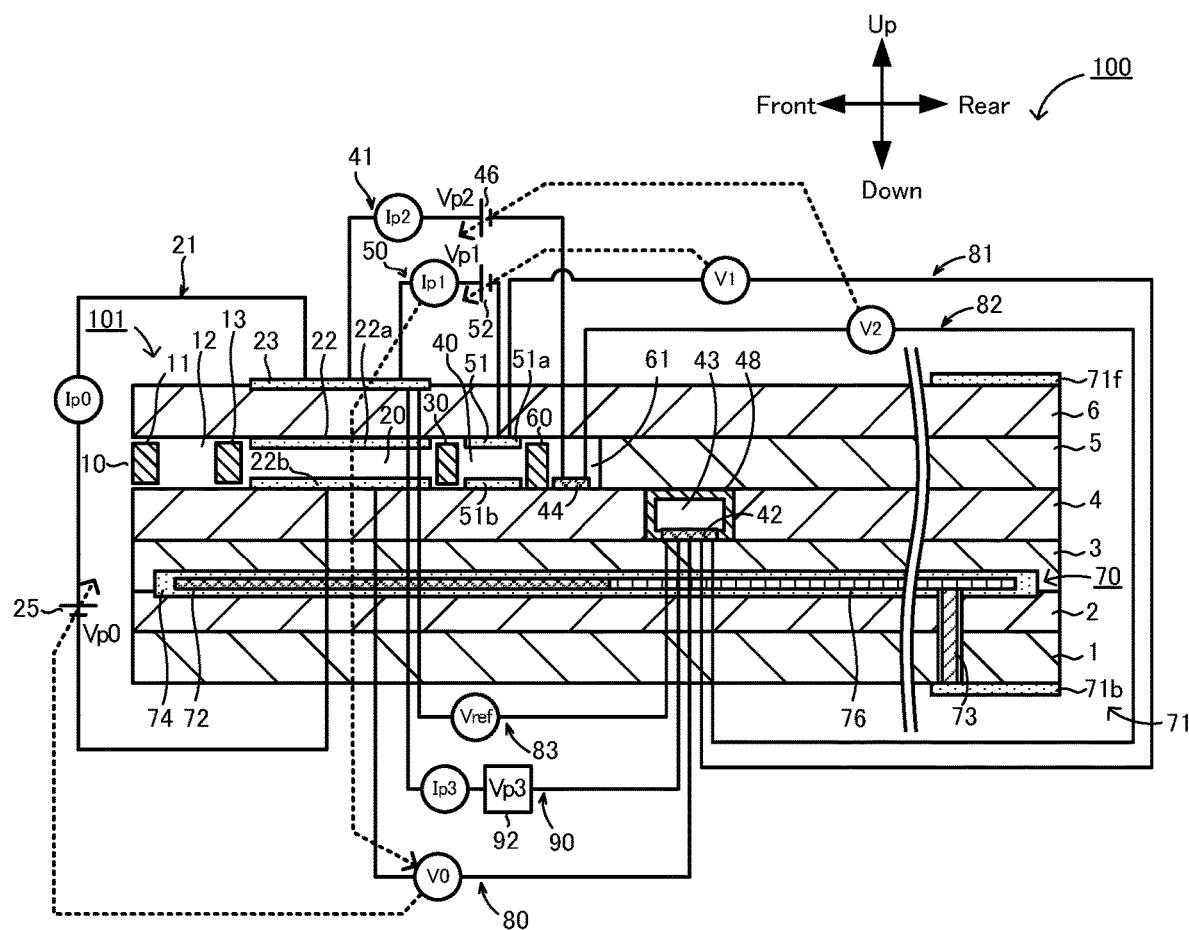
FIG. 2 is a schematic cross-sectional view schematically showing an example of the configuration of a sensor element 101.
Figure 3:
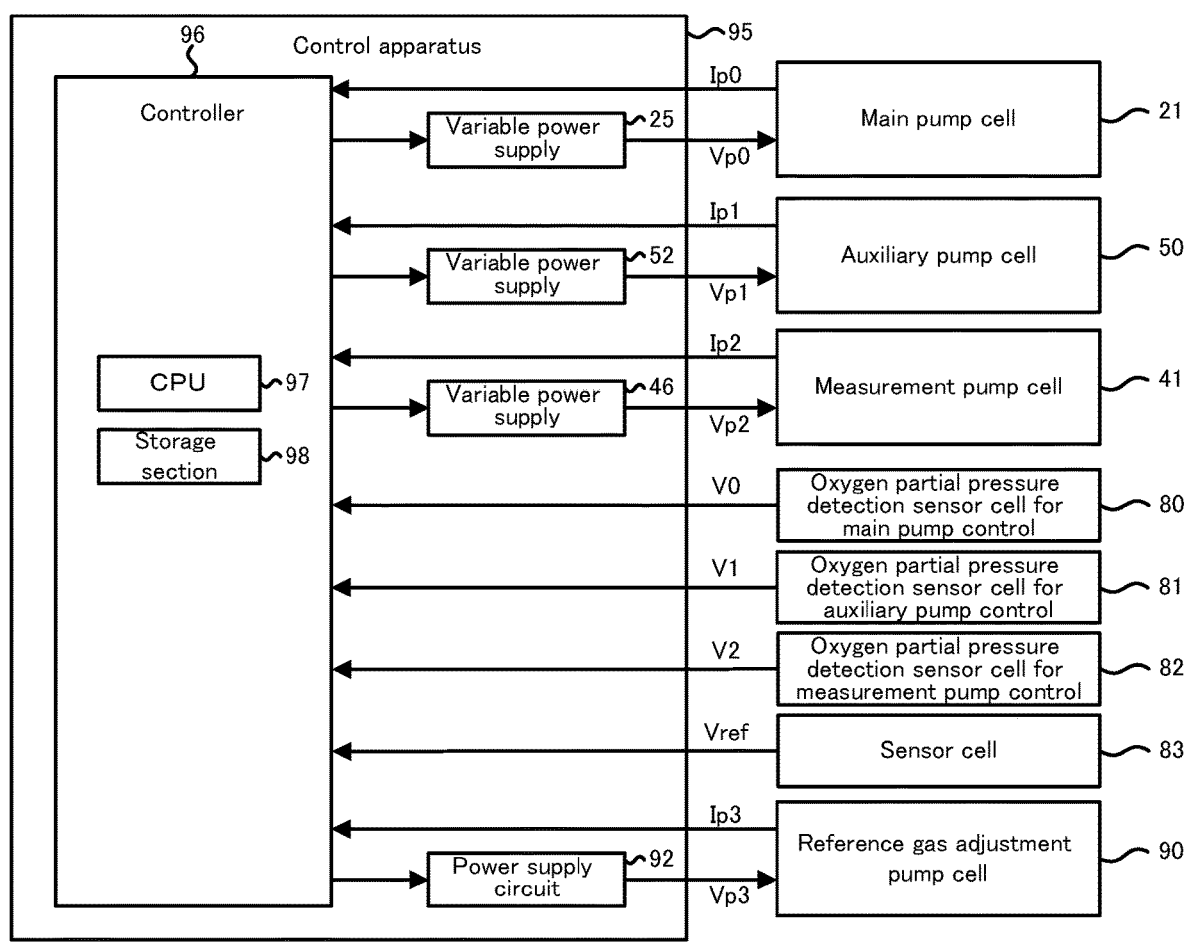
FIG. 3 is a block diagram showing an electrical connection relation between a control apparatus 95 and each of cells.
Figure 4:
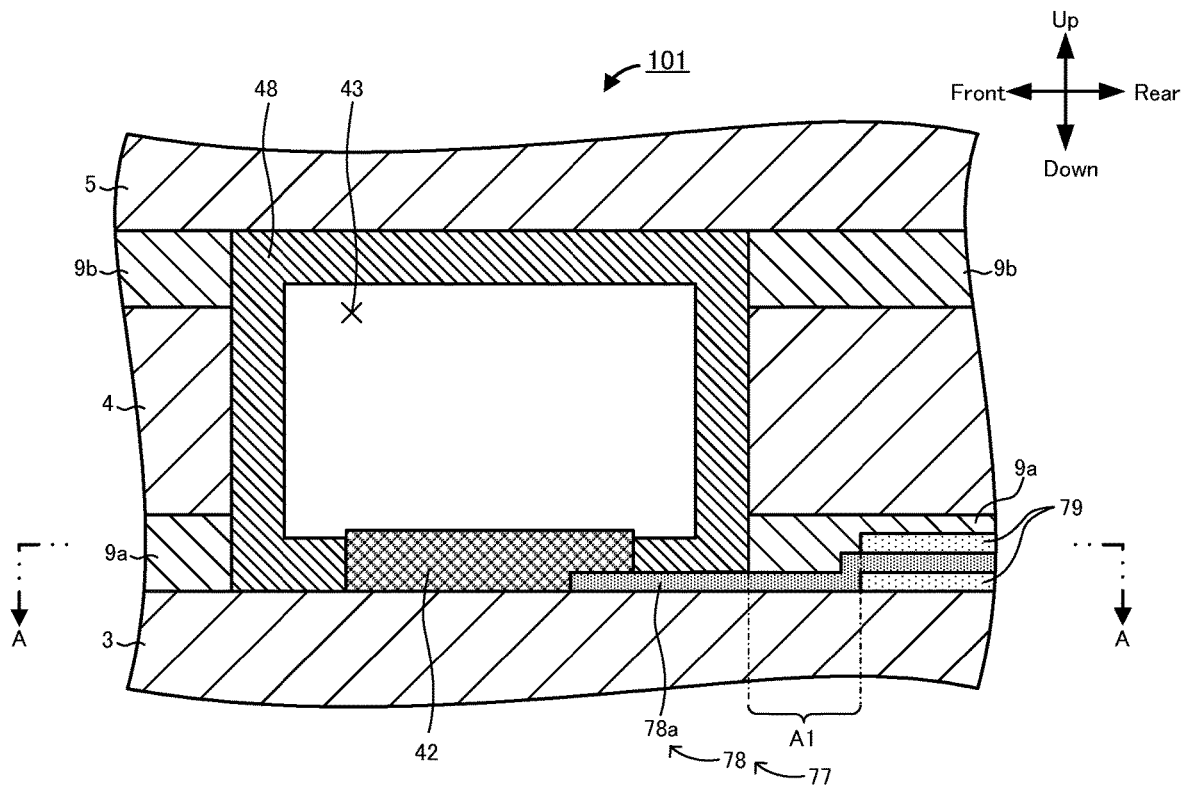
FIG. 4 is an enlarged partially cross-sectional view around a reference electrode 42 of the sensor element 101.
Figure 5:
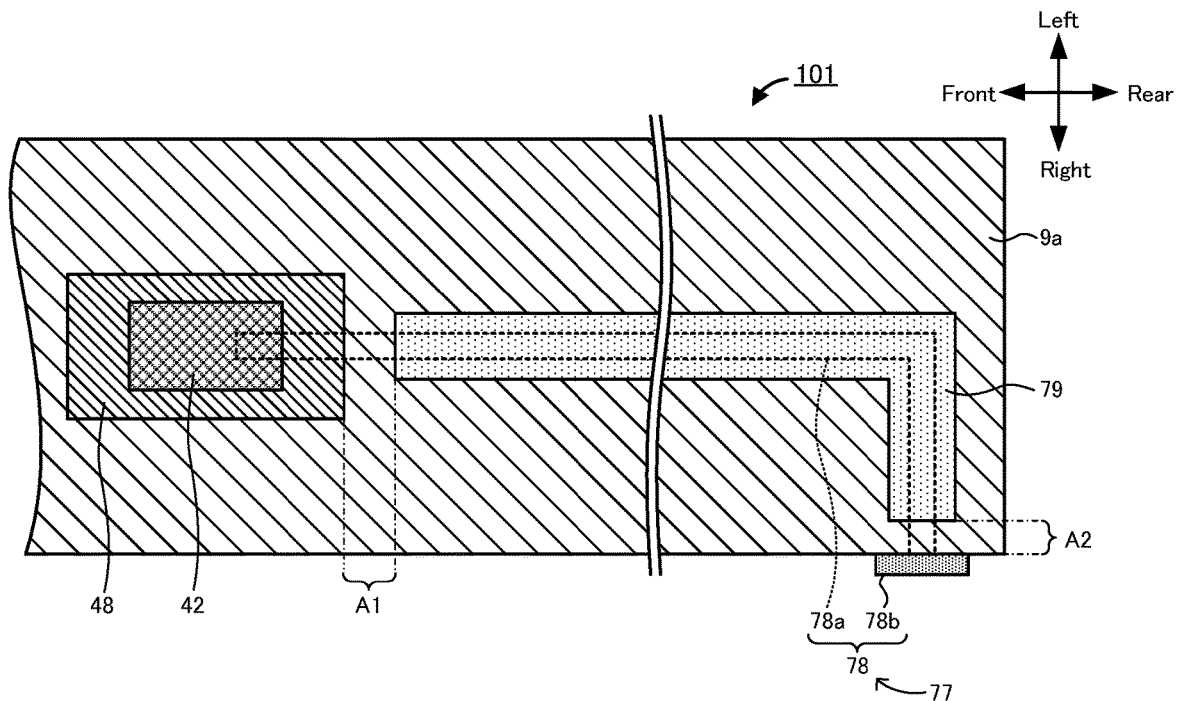
FIG. 5 is a cross-sectional view taken along the line A-A in FIG. 4.

Next, an embodiment of the present invention will be described with reference to the drawings. FIG. 1 is a longitudinal sectional view of a gas sensor 100 that is the embodiment of the present invention. FIG. 2 is a schematic cross-sectional view schematically showing an example of the configuration of a sensor element 101 included in the gas sensor 100. FIG. 3 is a block diagram showing an electrical connection relation between a control apparatus 95 and each of cells. FIG. 4 is an enlarged partially cross-sectional view around a reference electrode 42 of the sensor element 101. FIG. 5 is a cross-sectional view taken along the line A-A in FIG. 4. The sensor element 101 has a long rectangular parallelepiped shape. A longitudinal direction (right and left direction in FIG. 2) of the sensor element 101 is defined as a front and rear direction, and a thickness direction (up and down direction in FIG. 2) of the sensor element 101 is defined as an up and down direction. A width direction (a direction perpendicular to the front and rear direction and the up and down direction) of the sensor element 101 is defined as a right and left direction.

As shown in FIG. 1, the gas sensor 100 includes a sensor element 101, a protective cover 130 that protects the front end side of the sensor element 101, and a sensor assembly 140 including a connector 150 electrically continuous with the sensor element 101. The gas sensor 100 is attached to a pipe 190, for example, an exhaust gas pipe of a vehicle, as shown in the drawing and is used to measure the concentration of a specific gas, such as NOx and $O_2$, contained in exhaust gas as a measurement-object gas. In the present embodiment, the gas sensor 100 is configured to measure a NOx concentration as a specific gas concentration.

The protective cover 130 has a bottomed cylindrical inner protective cover 131 that covers the front end of the sensor element 101 and a bottomed cylindrical outer protective cover 132 that covers the inner protective cover 131. The inner protective cover 131 and the outer protective cover 132 have a plurality of holes for flowing measurement-object gas into the protective cover 130. A sensor element chamber 133 is formed as a space surrounded by the inner protective cover 131. The front end of the sensor element 101 is disposed in the sensor element chamber 133.

The sensor assembly 140 includes an element sealing body 141 that fixedly encapsulates the sensor element 101, a bolt 147 and an outer cylinder 148 attached to the element sealing body 141, and a connector 150 in contact with connector electrodes 71 formed on the surface (top and under surfaces) at the rear end of the sensor element 101 and electrically connected to them.

The element sealing body 141 includes a cylindrical main fitting 142, a cylindrical inner cylinder 143 fixedly welded coaxially to the main fitting 142, ceramic supporters 144a to 144c encapsulated in a through-hole formed inside the main fitting 142 and the inner cylinder 143, green compacts 145a, 145b, and a metal ring 146. The sensor element 101 is located in the central axis of the element sealing body 141 and extends through the element sealing body 141 in the front and rear direction. The inner cylinder 143 has a reduced diameter portion 143a for pressing the green compact 145b in the direction of the central axis of the inner cylinder 143, and a reduced diameter portion 143b for pressing forward the ceramic supporters 144a to 144c and the green compacts 145a, 145b via the metal ring 146. When the green compacts 145a, 145b are compressed between both the main fitting 142 and the inner cylinder 143 and the sensor element 101 by pressing force from the reduced diameter portions 143a, 143b, the green compacts 145a, 145b seal the sensor element chamber 133 in the protective cover 130 and a space 149 in the outer cylinder 148 from each other and fixes the sensor element 101.

The bolt 147 is fixed coaxially with the main fitting 142 and has an external thread portion on its outer peripheral surface. The external thread portion of the bolt 147 is welded to the pipe 190 and is inserted in a fixing member 191 having an internal thread portion on its inner peripheral surface. Thus, the gas sensor 100 is fixed to the pipe 190 in a state where portions including the front end of the sensor element 101 and the protective cover 130 in the gas sensor 100 protrude into the pipe 190.

The outer cylinder 148 covers around the inner cylinder 143, the sensor element 101, and the connector 150, and a plurality of lead wires 155 connected to the connector 150 is extended to the outside from the rear end. The lead wires 155 are electrically continuous with electrodes (described later) of the sensor element 101 via the connector 150. A gap between the outer cylinder 148 and the lead wires 155 is sealed by a rubber plug 157. The space 149 in the outer cylinder 148 is filled with air. The rear end of the sensor element 101 is disposed in the space 149.

The sensor element 101 is an element having a layered body in which six layers, that is, a first substrate layer 1, a second substrate layer 2, a third substrate layer 3, a first solid electrolyte layer 4, a spacer layer 5, and a second solid electrolyte layer 6, each made up of an oxygen-ion-conductive solid electrolyte layer made of zirconia ($ZrO_2$) or the like, are laminated in this order from a lower side in the drawing. The solid electrolyte forming these six layers is a dense, airtight one. The sensor element 101 is manufactured by, for example, applying predetermined processing, printing of a circuit pattern, and the like on a ceramic green sheet corresponding to each layer, then laminating those sheets, and further firing the sheets to be integrated.

At one end of the sensor element 101 (left side in FIG. 2), a gas inlet port 10, a first diffusion controlled portion 11, a buffer space 12, a second diffusion controlled portion 13, a first internal cavity 20, a third diffusion controlled portion 30, a second internal cavity 40, a fourth diffusion controlled portion 60, and a third internal cavity 61 are formed adjacent to each other so as to communicate with each other in this order between the under surface of the second solid electrolyte layer 6 and the top surface of the first solid electrolyte layer 4.

The gas inlet port 10, the buffer space 12, the first internal cavity 20, the second internal cavity 40, and the third internal cavity 61 are spaces of which top parts, bottom parts, and side parts, provided by hollowing the spacer layer 5, are respectively defined by the under surface of the second solid electrolyte layer 6, the top surface of the first solid electrolyte layer 4, and the side surface of the spacer layer 5 inside the sensor element 101.

Each of the first diffusion controlled portion 11, the second diffusion controlled portion 13, and the third diffusion controlled portion 30 is provided as two laterally long slits (openings of which the longitudinal direction is a direction perpendicular to the drawing). The fourth diffusion controlled portion 60 is provided as a single laterally long slit (an opening of which the longitudinal direction is a direction perpendicular to the drawing) formed as a clearance from the under surface of the second solid electrolyte layer 6. A part from the gas inlet port 10 to the third internal cavity 61 is also referred to as measurement-object gas flow portion.

A reference gas chamber 43 is provided between the under surface of the spacer layer 5 and the top surface of the third substrate layer 3. The reference gas chamber 43 is a space inside the sensor element 101, provided by hollowing the first solid electrolyte layer 4. The reference gas chamber 43 is a region to store a reference gas that is a reference at the time of measuring a NOx concentration. The reference gas is a gas having a predetermined oxygen concentration. In the present embodiment, the reference gas is air or a gas having the same oxygen concentration as air (for example, a gas of which the base gas is nitrogen and which contains oxygen). The reference electrode 42 is disposed in the reference gas chamber 43.

The reference electrode 42 is an electrode disposed on the top surface of the third substrate layer 3. The reference electrode 42 is directly formed on the top surface of the third substrate layer 3. As will be described later, it is possible to measure an oxygen concentration (oxygen partial pressure) in the first internal cavity 20, an oxygen concentration (oxygen partial pressure) in the second internal cavity 40, and an oxygen concentration (oxygen partial pressure) in the third internal cavity 61 by using the reference electrode 42. The reference electrode 42 is formed as a porous cermet electrode (for example, a cermet electrode of Pt and $ZrO_2$).

In the measurement-object gas flow portion, the gas inlet port 10 is a portion that is open to an external space, and a measurement-object gas is taken into the sensor element 101 from the external space through the gas inlet port 10. The first diffusion controlled portion 11 is a portion that applies predetermined diffusion resistance to a measurement-object gas taken in through the gas inlet port 10. The buffer space 12 is a space provided to guide the measurement-object gas introduced from the first diffusion controlled portion 11 to the second diffusion controlled portion 13. The second diffusion controlled portion 13 is a portion that applies predetermined diffusion resistance to the measurement-object gas introduced from the buffer space 12 into the first internal cavity 20. When the measurement-object gas is introduced from the outside of the sensor element 101 into the first internal cavity 20, the measurement-object gas rapidly taken into the sensor element 101 through the gas inlet port 10 due to pressure fluctuations of the measurement-object gas in the external space (when the measurement-object gas is the exhaust gas of an automobile, pulsation of exhaust pressure) is not directly introduced into the first internal cavity 20 but, after pressure fluctuations of the measurement-object gas are cancelled out through the first diffusion controlled portion 11, the buffer space 12, and the second diffusion controlled portion 13, the measurement-object gas is introduced into the first internal cavity 20. With this configuration, pressure fluctuations of the measurement-object gas introduced into the first internal cavity 20 are almost ignorable. The first internal cavity 20 is provided as a space used to adjust an oxygen partial pressure in the measurement-object gas introduced through the second diffusion controlled portion 13. A main pump cell 21 operates to adjust the oxygen partial pressure.

The main pump cell 21 is an electrochemical pump cell made up of an inner pump electrode 22 having a ceiling electrode portion 22a provided almost all over the under surface of the second solid electrolyte layer 6, facing the first internal cavity 20, the outer pump electrode 23 provided so as to be exposed to the external space (the sensor element chamber 133 in FIG. 1) in a region of the top surface of the second solid electrolyte layer 6, corresponding to the ceiling electrode portion 22a, and the second solid electrolyte layer 6 sandwiched by these electrodes.

The inner pump electrode 22 is formed over the upper and lower solid electrolyte layers (the second solid electrolyte layer 6 and the first solid electrolyte layer 4) defining the first internal cavity 20, and the spacer layer 5 providing a side wall. Specifically, the ceiling electrode portion 22a is formed on the under surface of the second solid electrolyte layer 6, providing a ceiling surface of the first internal cavity 20, a bottom electrode portion 22b is directly formed on the top surface of the first solid electrolyte layer 4, providing a bottom surface, a side electrode portion (not shown) is formed on the side wall surface (inner surface) of the spacer layer 5, making both side wall portions of the first internal cavity 20, so as to connect those ceiling electrode portion 22a and the bottom electrode portion 22b, and the inner pump electrode 22 is disposed with a structure in a tunnel form at a portion where the side electrode portion is disposed.

The inner pump electrode 22 and the outer pump electrode 23 each are formed as a porous cermet electrode (for example, a cermet electrode of Pt and $ZrO_2$, having an Au content of 1 percent). The inner pump electrode 22 that is exposed to a measurement-object gas is formed by using a material of which the reduction ability for NOx components in the measurement-object gas is lowered.

By passing a pump current Ip0 in a positive direction or a negative direction between the inner pump electrode 22 and the outer pump electrode 23 through application of a desired pump voltage Vp0 between the inner pump electrode 22 and the outer pump electrode 23, the main pump cell 21 is capable of pumping out oxygen in the first internal cavity 20 to the external space or pumping oxygen in the external space into the first internal cavity 20.

In order to detect an oxygen concentration (oxygen partial pressure) in an atmosphere in the first internal cavity 20, an electrochemical sensor cell, that is, an oxygen partial pressure detection sensor cell 80 for main pump control, is made up of the inner pump electrode 22, the second solid electrolyte layer 6, the spacer layer 5, the first solid electrolyte layer 4, the third substrate layer 3, and the reference electrode 42.

An oxygen concentration (oxygen partial pressure) in the first internal cavity 20 is found by measuring an electromotive force (voltage V0) in the oxygen partial pressure detection sensor cell 80 for main pump control. In addition, the pump current Ip0 is controlled by executing feedback control over the pump voltage Vp0 of a variable power supply 25 such that the voltage V0 becomes constant (target value). With this configuration, it is possible to maintain the oxygen concentration in the first internal cavity 20 at a predetermined constant value.

The third diffusion controlled portion 30 is a portion that applies predetermined diffusion resistance to a measurement-object gas of which the oxygen concentration (oxygen partial pressure) is controlled by operation of the main pump cell 21 in the first internal cavity 20, to guide the measurement-object gas to the second internal cavity 40.

The second internal cavity 40 is provided as a space used to further adjust the oxygen partial pressure by using an auxiliary pump cell 50 for the measurement-object gas adjusted in the oxygen concentration (oxygen partial pressure) in the first internal cavity 20 in advance and then introduced through the third diffusion controlled portion 30. With this configuration, it is possible to highly accurately maintain the oxygen concentration in the second internal cavity 40 at a constant value, so it is possible to measure a highly accurate NOx concentration with the gas sensor 100.

The auxiliary pump cell 50 is an auxiliary electrochemical pump cell made up of an auxiliary pump electrode 51 having a ceiling electrode portion 51a provided substantially all over the under surface of the second solid electrolyte layer 6, facing the second internal cavity 40, the outer pump electrode 23 (not limited to the outer pump electrode 23, and an adequate electrode outside the sensor element 101 may be used), and the second solid electrolyte layer 6.

The auxiliary pump electrode 51 is disposed in the second internal cavity 40 with a structure in a similar tunnel form to that of the inner pump electrode 22 provided in the above-described first internal cavity 20. In other words, the auxiliary pump electrode 51 has such a structure in a tunnel form that a ceiling electrode portion 51a is formed on the second solid electrolyte layer 6 providing the ceiling surface of the second internal cavity 40, a bottom electrode portion 51b is directly formed on the top surface of the first solid electrolyte layer 4 providing the bottom surface of the second internal cavity 40, a side electrode portion (not shown) that couples those ceiling electrode portion 51a and bottom electrode portion 51b is formed on each of both wall surfaces of the spacer layer 5, providing a side wall of the second internal cavity 40. The auxiliary pump electrode 51, as well as the inner pump electrode 22, is formed by using a material of which the reduction ability for NOx components in the measurement-object gas is lowered.

By applying a desired voltage Vp1 between the auxiliary pump electrode 51 and the outer pump electrode 23, the auxiliary pump cell 50 is capable of pumping out oxygen in an atmosphere in the second internal cavity 40 to the external space or pumping oxygen from the external space into the second internal cavity 40.

In order to control an oxygen partial pressure in an atmosphere in the second internal cavity 40, an electrochemical sensor cell, that is, an oxygen partial pressure detection sensor cell 81 for auxiliary pump control, is made up of the auxiliary pump electrode 51, the reference electrode 42, the second solid electrolyte layer 6, the spacer layer 5, the first solid electrolyte layer 4, and the third substrate layer 3.

The auxiliary pump cell 50 performs pumping with a variable power supply 52 of which the voltage is controlled in accordance with an electromotive force (voltage V1) detected by the oxygen partial pressure detection sensor cell 81 for auxiliary pump control. With this configuration, the oxygen partial pressure in an atmosphere in the second internal cavity 40 is controlled to a low partial pressure that substantially does not influence measurement of NOx.

Together with this, its pump current Ip1 is used to control the electromotive force of the oxygen partial pressure detection sensor cell 80 for main pump control. Specifically, the pump current Ip1 is input to the oxygen partial pressure detection sensor cell 80 for main pump control as a control signal, and the gradient of the oxygen partial pressure in the measurement-object gas to be introduced from the third diffusion controlled portion 30 into the second internal cavity 40 is controlled to be constantly unchanged by controlling the above-described target value of the voltage V0. When used as a NOx sensor, the oxygen concentration in the second internal cavity 40 is maintained at a constant value of about 0.001 ppm by the functions of the main pump cell 21 and auxiliary pump cell 50.

The fourth diffusion controlled portion 60 is a portion that applies predetermined diffusion resistance to measurement-object gas of which the oxygen concentration (oxygen partial pressure) is controlled by operation of the auxiliary pump cell 50 in the second internal cavity 40 to guide the measurement-object gas to the third internal cavity 61. The fourth diffusion controlled portion 60 plays a role in limiting the amount of NOx flowing into the third internal cavity 61.

The third internal cavity 61 is provided as a space used to perform a process related to measurement of a nitrogen oxide (NOx) concentration in a measurement-object gas on the measurement-object gas adjusted in oxygen concentration (oxygen partial pressure) in the second internal cavity 40 in advance and then introduced through the fourth diffusion controlled portion 60. Measurement of a NOx concentration is mainly performed by operation of a measurement pump cell 41 in the third internal cavity 61.

The measurement pump cell 41 measures a NOx concentration in the measurement-object gas in the third internal cavity 61. The measurement pump cell 41 is an electrochemical pump cell made up of a measurement electrode 44 provided directly on the top surface of the first solid electrolyte layer 4, facing the third internal cavity 61, the outer pump electrode 23, the second solid electrolyte layer 6, the spacer layer 5, and the first solid electrolyte layer 4. The measurement electrode 44 is a porous cermet electrode (for example, a cermet electrode of Pt and $ZrO_2$) made of a material of which the reduction ability for NOx components in the measurement-object gas is raised as compared to the inner pump electrode 22. The measurement electrode 44 also functions as a NOx reduction catalyst that reduces NOx present in an atmosphere in the third internal cavity 61.

The measurement pump cell 41 is capable of pumping out oxygen produced as a result of decomposition of nitrogen oxides in an atmosphere around the measurement electrode 44 and detecting the amount of oxygen produced as a pump current Ip2.

In order to detect an oxygen partial pressure around the measurement electrode 44, an electrochemical sensor cell, that is, a oxygen partial pressure detection sensor cell 82 for measurement pump control, is made up of the first solid electrolyte layer 4, the third substrate layer 3, the measurement electrode 44, and the reference electrode 42. A variable power supply 46 is controlled in accordance with an electromotive force (voltage V2) detected by the oxygen partial pressure detection sensor cell 82 for measurement pump control.

A measurement-object gas guided into the second internal cavity 40 reaches the measurement electrode 44 in the third internal cavity 61 through the fourth diffusion controlled portion 60 in a situation in which the oxygen partial pressure is controlled. Nitrogen oxides in the measurement-object gas around the measurement electrode 44 are reduced ($2NO \rightarrow N_2 + O_2$) to produce oxygen. The produced oxygen is to be pumped by the measurement pump cell 41. At this time, the voltage Vp2 of the variable power supply 46 is controlled such that the voltage V2 detected by the oxygen partial pressure detection sensor cell 82 for measurement pump control is constant (target value). The amount of oxygen produced around the measurement electrode 44 is proportional to the concentration of nitrogen oxides in the measurement-object gas, so a nitrogen oxide concentration in the measurement-object gas is calculated by using the pump current Ip2 in the measurement pump cell 41.

An electrochemical sensor cell 83 is made up of the second solid electrolyte layer 6, the spacer layer 5, the first solid electrolyte layer 4, the third substrate layer 3, the outer pump electrode 23, and the reference electrode 42, and it is possible to detect an oxygen partial pressure in a measurement-object gas outside the sensor by using an electromotive force (voltage Vref) obtained by the sensor cell 83.

In addition, an electrochemical reference gas adjustment pump cell 90 is made up of the second solid electrolyte layer 6, the spacer layer 5, the first solid electrolyte layer 4, the third substrate layer 3, the outer pump electrode 23, and the reference electrode 42. The reference gas adjustment pump cell 90 performs pumping of oxygen as a result of passage of the pump current Ip3 caused by a control voltage Vp3 applied from a power supply circuit 92 connected between the outer pump electrode 23 and the reference electrode 42. Thus, the reference gas adjustment pump cell 90 is capable of pumping in oxygen from a space around the outer pump electrode 23 (the sensor element chamber 133 in FIG. 1) to a space around the reference electrode 42, that is, the reference gas chamber 43, or pumping out oxygen from the reference gas chamber 43 to the space around the outer pump electrode 23.

In the gas sensor 100 having such a configuration, a measurement-object gas of which the oxygen partial pressure is maintained at a constantly unchanged low value (a value that substantially does not influence measurement of NOx) is supplied to the measurement pump cell 41 by operating the main pump cell 21 and the auxiliary pump cell 50. Therefore, it is possible to find a NOx concentration in the measurement-object gas in accordance with a pump current Ip2 that flows as a result of pumping out oxygen, produced by reduction of NOx, by the measurement pump cell 41 substantially in proportion to a NOx concentration in the measurement-object gas.

In addition, the sensor element 101 includes the heater portion 70 that plays a role in temperature adjustment for maintaining the temperature of the sensor element 101 by heating in order to increase the oxygen ion conductivity of the solid electrolytes. The heater portion 70 includes a heater 72, a heater insulating layer 74, and a lead wire 76.

The heater 72 is an electric resistor formed in such a manner as to be sandwiched by the second substrate layer 2 and the third substrate layer 3 from upper and lower sides. The heater 72 is supplied with electric power from an external source to generate heat to increase and retain the temperature of the solid electrolytes forming the sensor element 101.

The heater 72 is embedded all over the region from the first internal cavity 20 to the third internal cavity 61, and is capable of adjusting the overall sensor element 101 to a temperature at which the solid electrolytes are activated.

The heater insulating layer 74 is an electrically insulating layer made up of porous alumina formed from an electrically insulating material, such as alumina, on the top and under surfaces of the heater 72. The heater insulating layer 74 is formed for the purpose of obtaining an electrical insulation property between the second substrate layer 2 and the heater 72 and an electrical insulation property between the third substrate layer 3 and the heater 72.

As shown in FIG. 3, the control apparatus 95 includes the above-described variable power supplies 25, 46, 52, the above-described power supply circuit 92, and a controller 96. The controller 96 is a microprocessor including a CPU 97, RAM (not shown), a storage section 98, and the like. The storage section 98 is, for example, nonvolatile memory, such as ROM, and is a device that stores various data. The controller 96 receives the voltages V0 to V2 and voltage Vref of the sensor cells 80 to 83. The controller 96 receives the pump currents Ip0 to Ip2 and pump current Ip3 respectively flowing through the pump cells 21, 50, 41, 90. The controller 96 controls the voltages Vp0 to Vp3 output from the variable power supplies 25, 46, 52 and the power supply circuit 92 by outputting control signals to the variable power supplies 25, 46, 52 and the power supply circuit 92. Thus, the controller 96 controls the pump cells 21, 41, 50, and 90. The controller 96 controls an electric power supplied from a heater power supply (not shown) to the heater 72 by outputting a control signal to the heater power supply. Thus, the controller 96 adjusts the temperature of the sensor element 101. The storage section 98 stores target values V0*, V1*, V2*, Ip1*, and the like (described later).

The controller 96 executes feedback control over the pump voltage Vp0 of the variable power supply 25 such that the voltage V0 becomes the target value V0* (that is, the oxygen concentration of the first internal cavity 20 becomes a target concentration).

The controller 96 executes feedback control over the voltage Vp1 of the variable power supply 52 such that the voltage V1 becomes a constant value (referred to as target value V1*) (that is, the oxygen concentration of the second internal cavity 40 becomes a predetermined low oxygen concentration that does not substantially influence measurement of NOx). Together with this, the controller 96 sets (executes feedback control over) the target value V0* of the voltage V0 in accordance with the pump current Ip1 such that the pump current Ip1 that flows due to the voltage Vp1 becomes a constant value (referred to as target value Ip1*). With this configuration, the gradient of oxygen partial pressure in a measurement-object gas to be introduced from the third diffusion controlled portion 30 into the second internal cavity 40 is constantly unchanged. In addition, the oxygen partial pressure in an atmosphere in the second internal cavity 40 is controlled to a low partial pressure that substantially does not influence measurement of NOx. The target value V0* is set to such a value that the oxygen concentration of the first internal cavity 20 is higher than 0% and becomes a low oxygen concentration.

The controller 96 executes feedback control over the voltage Vp2 of the variable power supply 46 such that the voltage V2 becomes a constant value (referred to as target value V2*) (that is, the oxygen concentration in the third internal cavity 61 becomes a predetermined low concentration). With this configuration, oxygen is pumped out from the third internal cavity 61 such that oxygen produced as a result of reduction of a specific gas (here, NOx) in a measurement-object gas in the third internal cavity 61 becomes substantially zero. Then, the controller 96 acquires a pump current Ip2 as a detected value corresponding to oxygen that is produced in the third internal cavity 61 from NOx and calculates a NOx concentration in the measurement-object gas in accordance with the pump current Ip2. The target value V2* is determined in advance to such a value that the pump current Ip2 that flows due to the voltage Vp2 subjected to feedback control is a limiting current. The storage section 98 stores a relational expression (for example, an expression of linear function), a map, or the like as the correspondence relation between a pump current Ip2 and a NOx concentration. Such a relational expression or map may be obtained in advance by experiments. The controller 96 detects a NOx concentration in the measurement-object gas in accordance with the acquired pump current Ip2 and the correspondence relation stored in the storage section 98.

The controller 96 passes the pump current Ip3 by controlling the power supply circuit 92 such that the voltage Vp3 is applied to the reference gas adjustment pump cell 90. Thus, the controller 96 is capable of pumping in oxygen from around the outer pump electrode 23 to the reference gas chamber 43 or pumping out oxygen in the reference gas chamber 43 to around the outer pump electrode 23.

Figure 6:
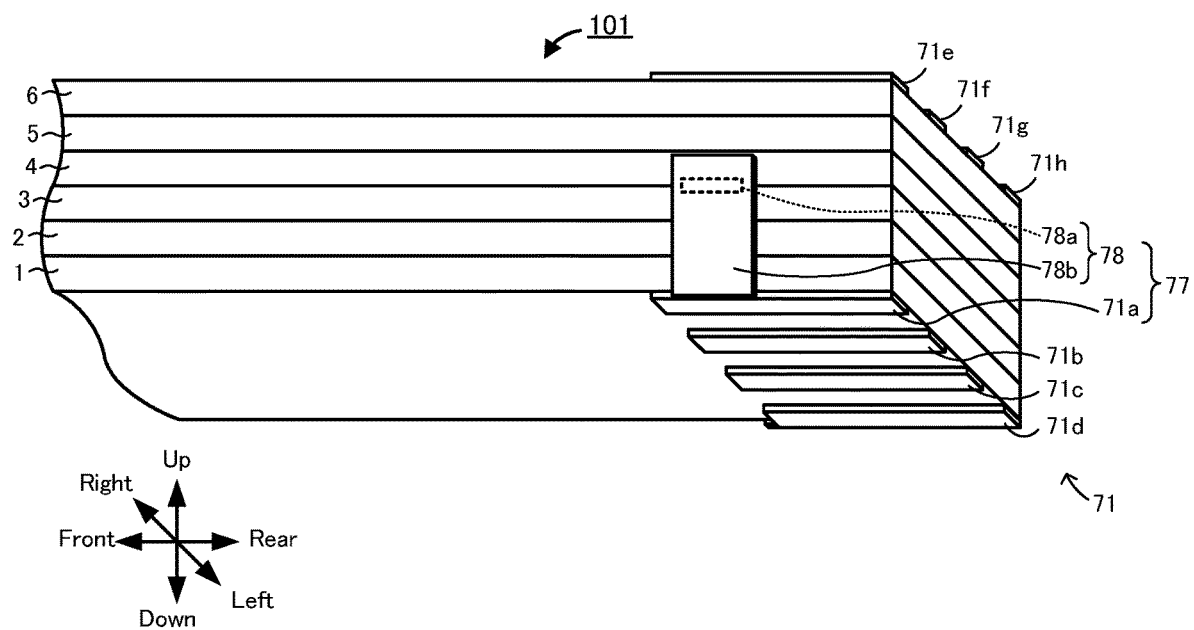
FIG. 6 is a perspective view around a rear end of the sensor element 101 when viewed from a right lower rear side.

The connector electrodes 71 are disposed at a rear end side of the sensor element 101. As shown in FIG. 6, the connector electrodes 71 include connector electrodes 71a to 71d disposed at the rear end of the under surface of the sensor element 101, and the connector electrodes 71e to 71h disposed at the rear end of the top surface of the sensor element 101. The connector electrodes 71 function as terminals used to provide electrical continuity between the sensor element 101 and a device outside the sensor element 101. The connector electrodes 71e to 71f are respectively electrically continuous in a one-to-one correspondence with the inner pump electrode 22, the outer pump electrode 23, the measurement electrode 44, and the auxiliary pump electrode 51 of the sensor element 101. The connector electrode 71a is electrically continuous with the reference electrode 42 via a reference electrode lead portion 78

(described later). The connector electrode 71b is connected to the heater 72 via a through-hole 73 and the lead wire 76 (see FIG. 2). The connector electrodes 71c, 71d each are also connected to the heater 72 via a through-hole (not shown) and a lead wire (not shown). The variable power supplies 25, 46, 52, the power supply circuit 92, and the like, shown in FIG. 2 are actually respectively connected to the electrodes (the inner pump electrode 22, the outer pump electrode 23, the reference electrode 42, the measurement electrode 44, and the auxiliary pump electrode 51) via the connector electrodes 71, the connector 150, and the lead wires 155 in FIG. 1. An electric power is also supplied from the external source to the heater portion 70 via the connector electrodes 71, the connector 150, and the lead wires 155 in FIG. 1.

Although not shown in FIG. 2 and FIG. 6, as shown in FIG. 4 and FIG. 5, a bonding layer 9a for bonding the third substrate layer 3 and the first solid electrolyte layer 4 is present therebetween, and a bonding layer 9b for bonding the first solid electrolyte layer 4 and the spacer layer 5 is present therebetween. The bonding layers 9a, 9b are dense layers similar to the layers 1 to 6. The bonding layers 9a, 9b are solid electrolyte layers having oxygen ion conductivity as well as the layers 1 to 6. In the present embodiment, the bonding layers 9a, 9b are made of ceramic containing zirconia as a main component as in the case of the layers 1 to 6. Not limited to the bonding layers 9a, 9b, a bonding layer is present between any adjacent layers of the layers 1 to 6 in the laminated direction.

Here, the reference gas chamber 43, reference electrode 42, and its surrounding configuration will be described in detail with reference to FIG. 4 to FIG. 6. The reference gas chamber 43 is a space inside the sensor element 101, surrounded by the under surface of the spacer layer 5, the front, rear, right, and left inner surfaces of each of the bonding layers 9a, 9b, and first solid electrolyte layer 4, and the top surface of the third substrate layer 3. The reference gas chamber 43, different from the measurement-object gas flow portion, is not open to the outside of the sensor element 101. The reference gas chamber 43 is provided inside the sensor element 101 in an isolated form so as not to communicate with the outside of the sensor element 101 or the measurement-object gas flow portion. The reference electrode 42 is desirably porous. The porosity of the reference electrode 42 may be higher than or equal to 10% or may be higher than or equal to 15%. The porosity of the reference electrode 42 may be lower than or equal to 40% or may be lower than or equal to 30%.

An electrically conductive portion 77 is connected to the reference electrode 42 disposed in the reference gas chamber 43. The electrically conductive portion 77 includes the above-described connector electrode 71a, and the reference electrode lead portion 78 that provides electrical continuity between the connector electrode 71a and the reference electrode 42. The reference electrode lead portion 78 includes an internal lead 78a and a side surface lead 78b. The internal lead 78a is disposed inside the sensor element 101 and provides electrical continuity between the reference electrode 42 and the side surface lead 78b. More specifically, the internal lead 78a is disposed between the third substrate layer 3 and the bonding layer 9a, extends rearward from the reference electrode 42, and is disposed up to the right side surface of the rear end portion of the sensor element 101 (see FIG. 5 and FIG. 6). The internal lead 78a is also disposed on the top surface of the third substrate layer 3 in the reference gas chamber 43, and its end portion is sandwiched between the reference electrode 42 and the third substrate layer 3 in the reference gas chamber 43 and is disposed so as to overlap the reference electrode 42. The side surface lead 78b is disposed on the right side surface of the rear end portion of the sensor element 101 and connects the internal lead 78a and the connector electrode 71a. An end portion of the internal lead 78a, exposed to the right side surface of the sensor element 101, is connected to the side surface lead 78b and is entirely covered with the side surface lead 78b. The electrically conductive portion 77 is, for example, an electric conductor containing precious metal, such as platinum (Pt), or a high-melting-point metal, such as tungsten (W) and molybdenum (Mo). The electrically conductive portion 77 is desirably an electric conductor of a cermet containing a precious metal or high-melting-point metal, and zirconia having the same main component as the third substrate layer 3.

Part of the internal lead 78a is surrounded by a lead insulating layer 79. A portion of the internal lead 78a, surrounded by the lead insulating layer 79, is electrically insulated from the first solid electrolyte layer 4 and the spacer layer 5. The lead insulating layer 79 is a ceramic insulator, such as alumina. The lead insulating layer 79 is porous and has, for example, a porosity of higher than 5% and lower than or equal to 10%. In the present embodiment, in a portion of the internal lead 78a, sandwiched by the bonding layer 9a and the third substrate layer 3, a portion other than a first portion A1 and a second portion A2 at both ends is surrounded by the lead insulating layer 79. The first portion A1 is a portion of the internal lead 78a, from the inner peripheral surface of the reference gas chamber 43 to an end portion, adjacent to the reference gas chamber 43, of the insulating layer 79. The second portion A2 is a portion of the internal lead 78a, from an end portion of the lead insulating layer 79 opposite from the reference gas chamber 43 to the outside of the sensor element 101. Since the first portion A1 and the second portion A2 are not coated with the lead insulating layer 79, that is, the lead insulating layer 79 is not present at each end of the portion of the internal lead 78a, sandwiched by the bonding layer 9a and the third substrate layer 3, the lead insulating layer 79 is configured, even when the lead insulating layer 79 is porous, not to serve as an oxygen movement path that connects the reference gas chamber 43 and the outside of the sensor element 101. An insulating layer similar to the lead insulating layer 79 may be present between the side surface lead 78b and the right side surface of the sensor element 101.

At least part of the electrically conductive portion 77 is densely formed so as to block movement of oxygen between the reference gas chamber 43 and the outside of the sensor element 101 (here, the space 149 in FIG. 1, in which the side surface lead 78b and the connector electrode 71a that are part of the electrically conductive portion 77 exposed) via the electrically conductive portion 77. In other words, a dense portion is present in at least any part of the electrically conductive portion 77 from the end portion adjacent to the reference gas chamber 43 to the end portion opposite from the reference gas chamber 43 (here, the connector electrode 71a) so as to block movement of oxygen. For example, when the internal lead 78a is not dense but the side surface lead 78b is dense, outflow of oxygen in the reference gas chamber 43 to the outside of the sensor element 101 through the reference electrode lead portion 78 can be blocked. Alternatively, even when the side surface lead 78b is not dense, a dense portion just needs to be present in any part in the internal lead 78a so as to block movement of oxygen from the reference electrode 42 to the side surface lead 78b. However, because the lead insulating layer 79 is porous, even when part of the portion of the internal lead 78a, surrounded by the lead insulating layer 79, is dense, oxygen may move around the dense portion via the lead insulating layer 79. For this reason, when a dense portion is provided in the internal lead 78a, it is desirable that a dense portion be provided such that such moving around of oxygen via the lead insulating layer 79 does not occur. When, for example, a dense portion is provided in the internal lead 78a, at least any one of the following conditions is desirably satisfied: a portion around the front end of the first portion A1 (that is, around a portion of the internal lead 78a, passing through the inner peripheral surface of the reference gas chamber 43) is a dense portion; a dense portion is present at the first portion A1; a dense portion is present at the second portion B2; and the entire part of the internal lead 78a, covered with the lead insulating layer 79, (a portion between the first portion A1 and the second portion A2) is a dense portion. In the present embodiment, the entire internal lead 78a of the electrically conductive portion 77 is densely formed. A dense part of the electrically conductive portion 77 just needs to have a porosity lower than or equal to 5% and desirably has a porosity lower than or equal to 2%.

A dense layer 48 is disposed in the reference gas chamber 43. The dense layer 48 is a dense layer and covers at least part of a portion made up of the solid electrolyte layer on the inner peripheral surface of the reference gas chamber 43. In the present embodiment, the inner peripheral surface of the reference gas chamber 43 is made up of the under surface of the spacer layer 5, the front, rear, right, and left inner surfaces of the bonding layers 9a, 9b, and first solid electrolyte layer 4, and the top surface of the third substrate layer 3, and the entire inner peripheral surface is made up of the solid electrolyte layers. The dense layer preferably covers 80% or higher of the exposed area of the solid electrolyte on the inner peripheral surface of the reference gas chamber 43, and more preferably covers 100%. In the present embodiment, as shown in FIG. 4 and FIG. 5, the dense layer 48 entirely covers the inner peripheral surface of the reference gas chamber 43. The dense layer 48 does not cover the top surface of the reference electrode 42. Thus, the reference electrode 42 is exposed to the space surrounded by the dense layer 48 in the reference gas chamber 43. The dense layer 48 also covers part of the internal lead 78a, disposed in the reference gas chamber 43. Because the dense layer 48 is dense, the dense layer 48 almost or totally does not pass oxygen molecules. The dense layer 48 has no oxygen ion conductivity. Examples of the material having no oxygen ion conductivity include alumina, silica, mullite, silicon nitride, and silicon carbide. The dense layer 48 contains one or more of these materials. In the present embodiment, the dense layer 48 is ceramic of alumina. The dense layer 48 just needs to have a porosity of lower than or equal to 5% and desirably has a porosity lower than or equal to 2%. The thickness of the dense layer 48 is desirably greater than or equal to 5 μm. The thickness of the dense layer 48 may be less than or equal to 100 μm.

The above-described porosities of the reference electrode 42, dense layer 48, reference electrode lead portion 78, lead insulating layer 79, and the like are values derived as follows by using an image (SEM image) obtained through observation with a scanning electron microscope (SEM). Initially, a measurement object is cut such that a measurement-object cross section is an observation surface, and the cut surface is subjected to resin embedding and polishing to be an observation sample. Subsequently, a measurement-object SEM image is obtained by taking an SEM photograph (secondary electron image, accelerating voltage: 15 kV, magnification: 1000 times, a magnification of greater than or equal to 1000 times and less than or equal to 5000 times is used when a magnification of 1000 times is inappropriate) of the observation surface of the observation sample. Next, the obtained image is subjected to image analysis, with the result that a threshold is determined through discriminant analysis (Otsu's binarization) from the brightness distribution of brightness data of pixels in the image. After that, pixels in the image are binarized into an object part and a pore part based on the determined threshold, and the area of the object part and the area of the pore part are calculated. Then, the ratio of the area of the pore part to the entire area (the total area of the object part and the pore part) is derived as a porosity (unit: %). Here, the term "dense" means that the porosity is lower than or equal to 5%. The term "porous" means that the porosity exceeds 5%.

Next, an example of a manufacturing method for the thus configured gas sensor 100 will be described below. Initially, six unfired ceramic green sheets each containing oxygen-ion-conductive solid electrolyte, such as zirconia, as a ceramic component are prepared. A plurality of sheet holes used for positioning during printing or during lamination, necessary through-holes, and the like is formed in advance in the green sheets. A space that will be the measurement-object gas flow portion is provided in the green sheet that will be the spacer layer 5 in advance by punching or the like. A space that will be the reference gas chamber 43 is provided in the green sheet that will be the first solid electrolyte layer 4 in advance by punching or the like. Then, a pattern printing process is performed to form various patterns in the ceramic green sheets in correspondence with the first substrate layer 1, the second substrate layer 2, the third substrate layer 3, the first solid electrolyte layer 4, the spacer layer 5, and the second solid electrolyte layer 6. The patterns to be formed are, specifically, for example, patterns of the electrodes including the above-described reference electrode 42 and the like, the dense layer 48, the leads connected to the electrodes, including the internal lead 78a and the like, the lead insulating layer 79, the connector electrodes 71, the heater portion 70, and the like. Pattern printing is performed by applying pattern forming paste prepared according to characteristics required for each of formation objects onto the green sheet by using a known screen printing technology. A pattern that will be the dense layer is formed by separately forming a pattern to be provided on the top surface of the third substrate layer 3, a pattern to be provided on the under surface of the spacer layer 5, and a pattern that covers a portion that will be the front, rear, right, and left side surfaces of the reference gas chamber 43 in the first solid electrolyte layer 4. A pattern that covers a portion to be the front, rear, right, and left side surfaces of the reference gas chamber 43 can be formed by, for example, known through-hole printing. Specifically, initially, a pattern made up of paste that will be the dense layer 48 is formed around the space (punched hole) that will be the reference gas chamber 43 on the top surface of the green sheet that will be the first solid electrolyte layer 4 by screen printing. Then, the paste is caused to flow into the space that will be the reference gas chamber 43 by setting the under surface side of the green sheet that will be the first solid electrolyte layer 4 to a negative pressure to apply the paste to the portion that will be the front, rear, right, and left side surfaces of the reference gas chamber 43. The pattern that will be the lead insulating layer 79 just needs to be formed by separately forming a portion that covers the lower side of the internal lead 78a and a portion that covers the upper side. After the pattern printing process is performed, a known drying device is used to perform a drying process.

When pattern printing and drying complete, a printing and drying process for bonding paste that will be bonding layers including the bonding layers 9a, 9b is performed to bond the green sheets corresponding to the layers. In a pressure bonding process, the green sheets on which the bonding paste is formed are laminated in a predetermined sequence while being positioned by using the sheet holes and then bonded by applying a predetermined temperature and pressure condition to form one layered body. The thus obtained layered body includes a plurality of the sensor elements 101. The layered body is cut into the size of each sensor element 101. After that, a pattern that will be the side surface lead 78b is formed by screen printing at a portion that will be the right surface of the sensor element 101, which is a cut surface of the layered body, and a drying process for the pattern is performed. The separated layered bodies are fired at a predetermined firing temperature to obtain the sensor elements 101. For example, paste containing ceramic particles including one or more types of the above-described alumina, silica, mullite, silicon nitride, silicon carbide, and the like is used as pattern forming paste for the dense layer 48 (in the present embodiment, ceramic particles are alumina particles). By using paste containing ceramic particles having a small particle diameter, it is possible to reduce the porosity of the dense layer 48 to be dense. For example, paste containing metal particles that are the above-described precious metal or high-melting-point metal is used as pattern forming paste for the electrically conductive portion 77 (here, the connector electrode 71a and the reference electrode lead portion 78). By using paste containing metal particles having a small particle diameter for at least part of the electrically conductive portion 77, it is possible to reduce the porosity of at least part of the electrically conductive portion 77 to be dense. By increasing the firing temperature or extending the firing time at the time of firing a layered body, it is possible to wholly reduce the porosity of various pattern forming pastes.

After that, the gas sensor 100 in which the sensor element 101 is assembled is manufactured. For example, the element sealing body 141 is attached to the sensor element 101 and fixedly sealed, and the connector 150 and the lead wires 155 are attached to the rear end side of the sensor element 101 so as to be electrically continuous with the connector electrode 71. The protective cover 130 is attached to the sensor element 101 tip end side of the element sealing body 141. The outer cylinder 148 is attached to the sensor element 101 rear end side of the element sealing body 141, and the lead wires 155 are extended from the outer cylinder 148 to the outside. The control apparatus 95 and the sensor element 101 are connected via the lead wires 155. Thus, the gas sensor 100 is obtained.

In a manufacturing process for the gas sensor 100, after the sensor element 101 is obtained or after the gas sensor 100 is obtained, it is desirable to perform an oxygen concentration checking process in which the oxygen concentration in the reference gas chamber 43 is checked and, where necessary, the oxygen concentration in the reference gas chamber 43 is adjusted. This process is, for example, performed as follows. Initially, in a state where the outer pump electrode 23 of the sensor element 101 is in contact with a gas (for example, air) having a known oxygen concentration, the voltage Vref of the sensor cell 83 is measured. Then, an oxygen concentration in the reference gas chamber 43 is derived in accordance with the known oxygen concentration and the voltage Vref. After that, it is checked whether the oxygen concentration in the reference gas chamber 43 falls within a predetermined oxygen concentration range regarded as the same as the oxygen concentration of reference gas. When the oxygen concentration in the reference gas chamber 43 falls outside the predetermined oxygen concentration range, oxygen is pumped into the reference gas chamber 43 or oxygen is pumped out from the reference gas chamber 43 by passing the pump current Ip3 through application of the control voltage Vp3 from the power supply circuit 92 to the reference gas adjustment pump cell 90. Thus, the oxygen concentration in the reference gas chamber 43 is adjusted so as to fall within the predetermined oxygen concentration range. Measurement of the voltage Vref and adjustment of the oxygen concentration in the reference gas chamber 43 may be performed by the control apparatus 95 of the gas sensor 100 or may be performed by an apparatus different from the control apparatus 95 and connected to the sensor element 101.

Even during usage of the gas sensor 100, the control apparatus 95 may perform the oxygen concentration checking process as in the case of the above in a state where the oxygen concentration of a measurement-object gas is known. When, for example, the measurement-object gas is the exhaust gas of an internal combustion engine, the oxygen concentration of the measurement-object gas is regarded as the same as that of air during fuel cut of the internal combustion engine, and the oxygen concentration checking process as in the case of the above may be performed. Even in the manufacturing process of the gas sensor 100 or during usage of the gas sensor 100, the control voltage Vp3 is not configured to be applied at the time of measurement of the voltage Vref in the oxygen concentration checking process. Furthermore, at the time of measurement of the voltage Vref, it is desirable not to perform control over the sensor element 101 such that a current is passed to the outer pump electrode 23 in order to reduce a measurement error due to a voltage drop of each of the outer pump electrode 23 and the reference electrode 42. Specifically, it is desirable to stop the operations of the main pump cell 21, the auxiliary pump cell 50, and the measurement pump cell 41 (the variable power supplies 25, 52, 46 are not configured to apply the voltages Vp0, Vp1, Vp2). Particularly, the pump current Ip0 flowing through the main pump cell 21 is relatively greater in value than the pump currents Ip1, Ip2 and, therefore, the voltage drop of the outer pump electrode 23 is large, so it is desirable to stop the operation of at least the main pump cell 21 among the main pump cell 21, the auxiliary pump cell 50, and the measurement pump cell 41.

Here, the correspondence relation between the components of the present embodiment and the components of the present invention are made apparent. The first substrate layer 1, the second substrate layer 2, the third substrate layer 3, the first solid electrolyte layer 4, the spacer layer 5, the second solid electrolyte layer 6, and the bonding layers 9a, 9b of the present embodiment each correspond to the solid electrolyte layer of the present invention, and these layers correspond to the element body. The reference gas chamber 43 corresponds to the reference gas chamber, the reference electrode 42 corresponds to the reference electrode, the connector electrode 71a corresponds to the reference electrode terminal, the reference electrode lead portion 78 corresponds to the reference electrode lead portion, and the electrically conductive portion 77 corresponds to the electrically conductive portion. The dense layer 48 corresponds to the dense layer. The outer pump electrode 23 corresponds to the outer electrode, the measurement electrode 44 corresponds to the measurement electrode, and the measurement pump cell 41 corresponds to the detection device.

In the sensor element 101 of the present embodiment described in detail above, the reference gas chamber 43 is provided inside the sensor element 101 in an isolated form so as not to communicate with the outside of the sensor element 101 or the measurement-object gas flow portion, and the reference electrode 42 is disposed in the reference gas chamber 43. At least part of the electrically conductive portion 77 connected to the reference electrode 42 is densely formed so as to block movement of oxygen between the reference gas chamber 43 and the outside of the sensor element 101 via the electrically conductive portion 77. With these, for example, in comparison with the case where reference gas is introduced from the outside to the reference electrode 942 through the reference gas inlet space 943 and the reference gas inlet layer 948 as in the case of the sensor element 907 of the existing example shown in FIG. 12, entry and exit of oxygen into and out of the reference gas chamber 43 are suppressed. Therefore, a change in oxygen concentration around the reference electrode 42 is further suppressed. For example, the sensor element chamber 133 and the space 149 in FIG. 1 are defined by the sensor assembly 140 (particularly, the green compacts 145a, 145b) and are sealed such that gas does not flow between each other. However, measurement-object gas may slightly enter the space 149 due to, for example, a high pressure of measurement-object gas side. Measurement-object gas may have a lower oxygen concentration than air or may contain contaminant, such as unburned components of the internal combustion engine, so the oxygen concentration in the space 149 may decrease when measurement-object gas enters the space 149. The oxygen concentration in the space 149 may also decrease due to occurrence of gas resulting from melt damage of the rubber plug 157 under exposure to high temperature or reaction of oil content adhering to the outer cylinder 148 with oxygen due to high temperature. However, even when these phenomena occur, the sensor element 101 of the present embodiment is less likely to cause entry and exit of gas between the reference gas chamber 43 and the space 149, so a change in the oxygen concentration around the reference electrode 42 is further suppressed. When the oxygen concentration around the reference electrode 42 changes, the values of the voltages V0, V1, V2, measured with reference to the potential of the reference electrode 42, also change, so the accuracy of detecting a specific gas concentration decreases; however, the sensor element 101 of the present embodiment suppresses a decrease in such detection accuracy.

The sensor element 101 covers at least part of a portion made up of the solid electrolyte layer on the inner peripheral surface of the reference gas chamber 43 and includes the dense layer 48 having no oxygen ion conductivity. Here, an oxygen-ion-conductive solid electrolyte may ionize and conduct oxygen therearound even when no voltage is applied. For this reason, if there is an exposed portion of the solid electrolyte layers (here, the third substrate layer 3, the first solid electrolyte layer 4, the spacer layer 5, and the bonding layers 9a, 9b) on the inner peripheral surface of the reference gas chamber 43, oxygen may slightly flow out from the space in the reference gas chamber 43 via the exposed portion. In contrast, since the dense layer 48 having no oxygen ion conductivity covers at least part of a portion made up of the solid electrolyte layer on the inner peripheral surface of the reference gas chamber 43, an exposed area of the solid electrolyte is reduced, so outflow of oxygen from the reference gas chamber 43 via the solid electrolyte is suppressed. Therefore, a change in oxygen concentration around the reference electrode 42 is further suppressed.

Furthermore, a spatial volume in the reference gas chamber 43 is desirably greater than or equal to 0.106 mm$^3$. When the spatial volume is greater than or equal to 0.106 mm$^3$, a change in oxygen concentration in the reference gas chamber 43 in the case where oxygen in the reference gas chamber 43 flows out is small, so a change in oxygen concentration around the reference electrode 42 is further suppressed. Even when, for example, the power supply circuit 92 is not connected, the cells 80 to 83 that are circuits for measuring the voltages V0 to V2, Vref are connected to the reference electrode 42, so oxygen around the reference electrode 42 may be slightly pumped out by a current slightly flowing through these circuits. By increasing the spatial volume in the reference gas chamber 43, even when such slight outflow of oxygen occurs, a change in oxygen concentration around the reference electrode 42 is suppressed. Here, it is defined that the term "spatial volume" includes the volume of pores of a porous object in the reference gas chamber 43 and does not include the volume of pores of a dense object (for example, the dense layer 48). More specifically, the "spatial volume" in the reference gas chamber 43 includes not only the volume of space other than pores (for example, the space surrounded by the dense layer 48 in FIG. 4) but also the volume of pores in the reference electrode 42, pores of a porous object in contact with the reference electrode 42, and pores of a porous substance connected to the reference electrode 42 via space other than pores or a porous object. In the present embodiment, since a porous object in contact with the reference electrode 42 or a porous substance connected to the reference electrode 42 via a space other than pores or a porous object is not present, the total of the volume of the space surrounded by the dense layer 48 in FIG. 4 and the volume of pores inside the reference electrode 42 corresponds to the "spatial volume". When, for example, part of the internal lead 78a, disposed in the reference gas chamber 43, is porous, that part applies to the "porous object in contact with the reference electrode 42", so the volume of pores of that part is also included in the "spatial volume". The volume of pores is calculated by "Total volume of porous object (volume including pores)× Porosity [%]/100". The spatial volume may be less than or equal to 30 mm$^3$.

The present invention is not limited to the above-described embodiment and may be, of course, implemented in various modes within the technical scope of the present invention.

Figure 7:
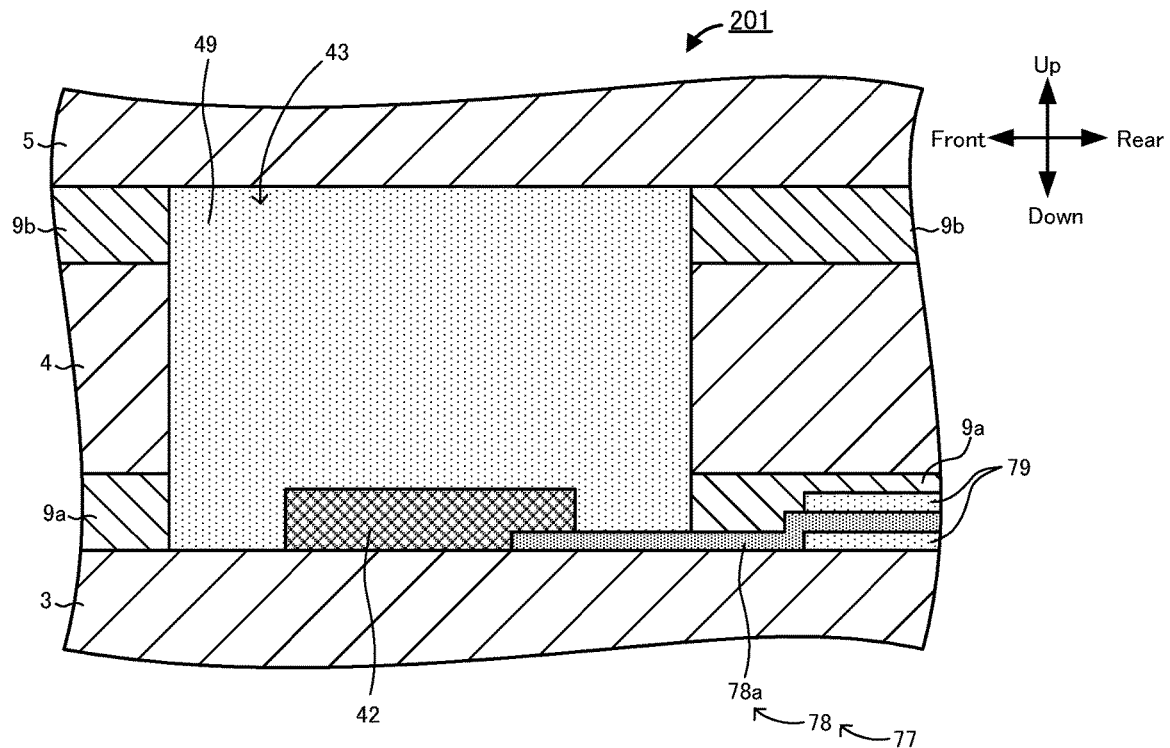
FIG. 7 is a partially cross-sectional view of a sensor element 201 of a modification.

For example, in the above-described embodiment, the sensor element 101 includes the dense layer 48. Instead of including the dense layer 48, the sensor element 101 may include a porous body 49 as in the case of a sensor element 201 of a modification shown in FIG. 7. The porous body 49 is filled in the reference gas chamber 43 and has no oxygen ion conductivity. The same materials as those of the above-described dense layer 48 may be used as the material of the porous body 49. In the sensor element 201, even when there is a portion made up of a solid electrolyte layer on the inner peripheral surface of the reference gas chamber 43, the exposed area of the solid electrolyte layer is reduced by the porous body 49, so outflow of oxygen from the reference gas chamber 43 via the solid electrolyte is suppressed. Since pores inside the porous body 49 function as space for storing reference gas, a spatial volume in the reference gas chamber 43 is ensured. With this configuration, a change in oxygen concentration around the reference electrode 42 is further suppressed. The porosity of the porous body 49 may be higher than or equal to 10%, may be higher than or equal to 20%, or may be lower than or equal to 30%. In this case, the spatial volume in the reference gas chamber 43 may be greater than or equal to 0.003 mm³. The spatial volume in the reference gas chamber 43 is desirably greater than or equal to 0.026 mm³. When the spatial volume is greater than or equal to 0.026 mm³, a change in oxygen concentration in the reference gas chamber 43 in the case where oxygen in the reference gas chamber 43 flows out is small, so a change in oxygen concentration around the reference electrode 42 is further suppressed. The spatial volume in the reference gas chamber 43 is more desirably greater than or equal to 0.164 mm³. The spatial volume in the reference gas chamber 43 may be less than or equal to 30 mm³. The "spatial volume" in the case of FIG. 7 is the sum of the volume of pores in the porous body 49 and the volume of pores in the reference electrode 42 in accordance with the above-described definition. In a mode in which the dense layer 48 is provided as in the case of FIG. 4, the porous body 49 may be filled inside the dense layer 48.

Figure 8:
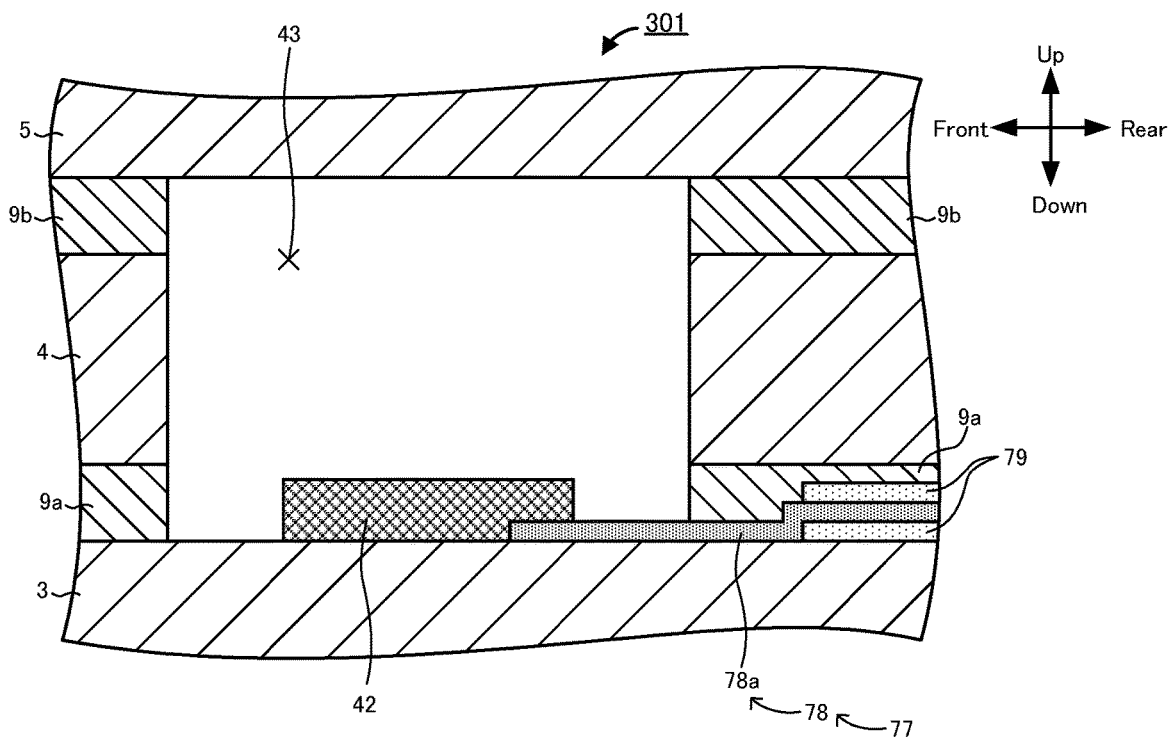
FIG. 8 is a partially cross-sectional view of a sensor element 301 of a modification.

In the above-described embodiment, the dense layer 48 may be omitted. In other words, both the dense layer 48 and the porous body 49 in FIG. 7 do not need to be present in the reference gas chamber 43. FIG. 8 is a partially cross-sectional view of a sensor element 301 of a modification in this case. With this configuration as well, when the reference gas chamber 43 is provided inside the sensor element 101 in an isolated form so as not to communicate with the outside of the sensor element 101 or the measurement-object gas flow portion and at least part of the electrically conductive portion 77 is densely formed so as to block movement of oxygen between the reference gas chamber 43 and the outside of the sensor element 101 via the electrically conductive portion 77, the effect of further suppressing a change in oxygen concentration around the reference electrode 42 is obtained. However, the exposed area of the solid electrolyte layer on the inner peripheral surface of the reference gas chamber 43 is reduced, so it is desirable to include at least one of the dense layer 48 and the porous body 49. In the reference gas chamber 43 of the mode shown in FIG. 8, the spatial volume in the reference gas chamber 43 may be greater than or equal to 0.126 mm³ or may be less than or equal to 30 mm³.

Figure 9:
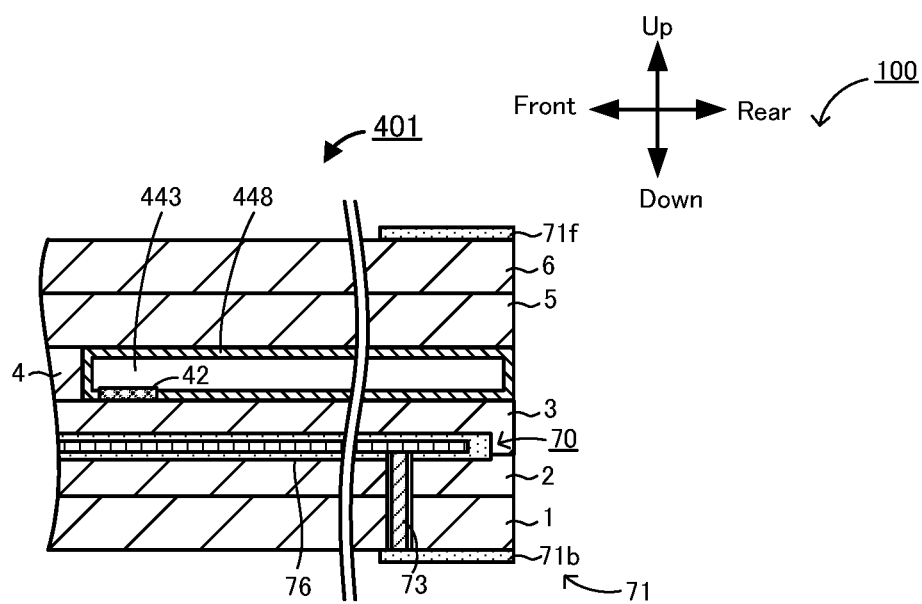
FIG. 9 is a partially cross-sectional view of a sensor element 401 of a modification.

In the above-described embodiment, all the front, rear, right, left, top, and bottom inner peripheral surfaces of the reference gas chamber 43 are solid electrolyte layers, however, the solid electrolyte layer does not need to be present on at least part of the inner peripheral surface. FIG. 9 is a partially cross-sectional view of a sensor element 401 of a modification in this case. A reference gas chamber 443 of the sensor element 401 is present up to near the rear end of the first solid electrolyte layer 4, and no solid electrolyte layer is present on the rear surface on the inner peripheral surface of the reference gas chamber 443. Alternatively, in order for the reference gas chamber 443 not to be open to the rear end surface of the sensor element 101, a dense layer 448 closes the rear end of the reference gas chamber 443. The dense layer 448 also covers the front, top, bottom, right, and left inner peripheral surfaces of the reference gas chamber 443. With this configuration as well, the reference gas chamber 443 can be provided inside the sensor element 401 in an isolated form so as not to communicate with the outside of the sensor element 401 or the measurement-object gas flow portion.

In the above-described embodiment, the reference gas chamber 43 may be occupied by the reference electrode 42. For example, the space part inside the dense layer 48 shown in FIG. 4 may be occupied by the reference electrode 42, or the dense layer 48 may be not present in the reference gas chamber 43 and the reference gas chamber 43 may be occupied by the reference electrode 42.

Figure 10:
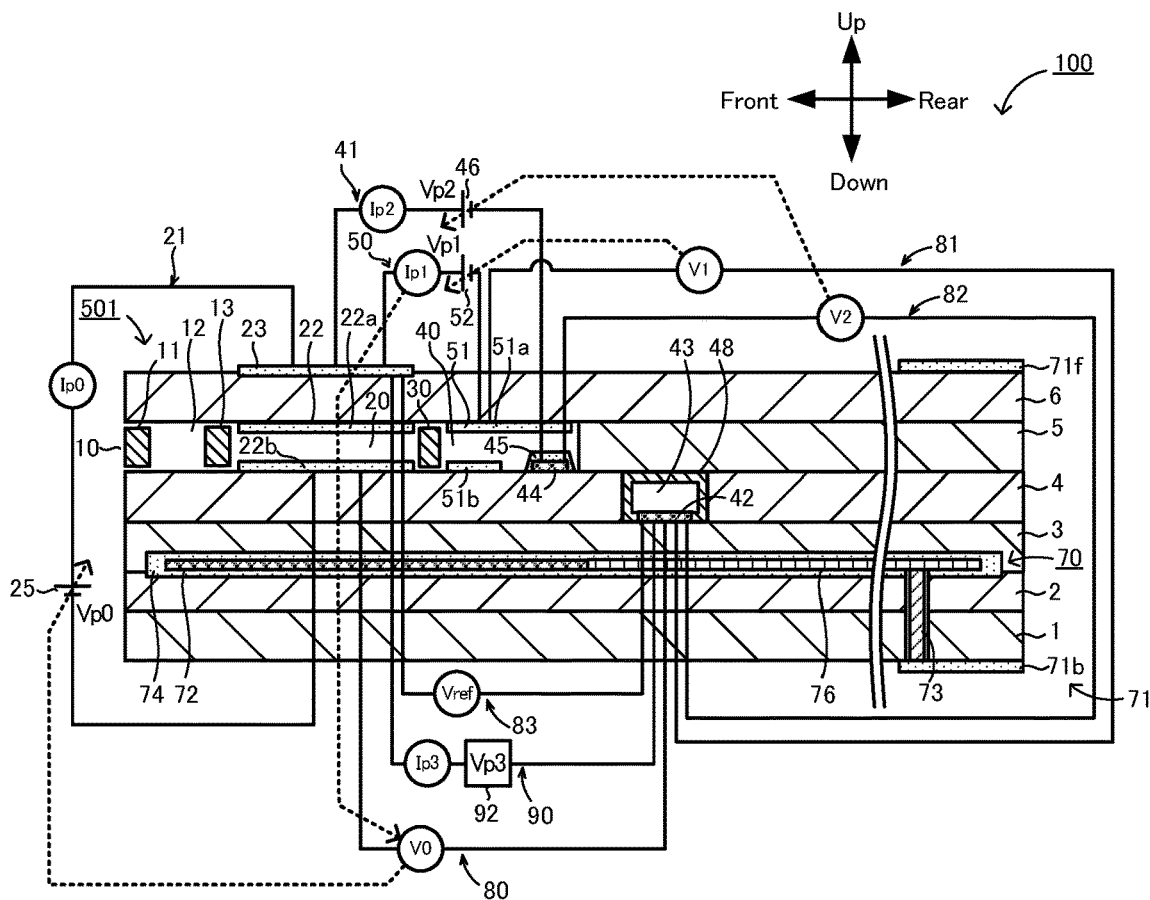
FIG. 10 is a schematic cross-sectional view of a sensor element 501 of a modification.

In the above-described embodiment, the sensor element 101 of the gas sensor 100 includes the first internal cavity 20, the second internal cavity 40, and the third internal cavity 61; however, the configuration is not limited thereto. For example, as in the case of a sensor element 501 of a modification shown in FIG. 10, the sensor element 501 does not need to include the third internal cavity 61. In the sensor element 501 of the modification shown in FIG. 10, the gas inlet port 10, the first diffusion controlled portion 11, the buffer space 12, the second diffusion controlled portion 13, the first internal cavity 20, the third diffusion controlled portion 30, and the second internal cavity 40 are formed adjacent to each other in this order between the under surface of the second solid electrolyte layer 6 and the top surface of the first solid electrolyte layer 4 so as to communicate with each other. The measurement electrode 44 is disposed on the top surface of the first solid electrolyte layer 4 in the second internal cavity 40. The measurement electrode 44 is coated with a fourth diffusion controlled portion 45. The fourth diffusion controlled portion 45 is a film made up of a ceramic porous material, such as alumina ($Al_2O_3$). The fourth diffusion controlled portion 45, as well as the fourth diffusion controlled portion 60 of the above-described embodiment, plays a role in limiting the amount of NOx flowing into the measurement electrode 44. The fourth diffusion controlled portion 45 also functions as a protection film for the measurement electrode 44. The ceiling electrode portion 51a of the auxiliary pump electrode 51 is formed up to just above the measurement electrode 44. With the thus configured sensor element 501 as well, it is possible to detect a NOx concentration with the measurement pump cell 41 as in the case of the above-described embodiment. In the sensor element 501 in FIG. 10, the surroundings of the measurement electrode 44 function as a measurement chamber. In other words, the surroundings of the measurement electrode 44 play a similar role to that of the third internal cavity 61.

In the above-described embodiment, the electrically conductive portion 77 includes the side surface lead 78b; however, the configuration is not limited thereto. For example, the electrically conductive portion 77 may include a through-hole conductor providing electrical continuity between the internal lead 78a and the connector electrode 71a and formed in a through-hole inside the sensor element 101, instead of the side surface lead 78b. In this case, part of the electrically conductive portion 77, exposed to the outside of the sensor element 101, is only the connector electrode 71a, so at least the connector electrode 71a of the electrically conductive portion 77 may be dense. With this configuration as well, movement of oxygen between the reference gas chamber 43 and the outside of the sensor element 101 via the electrically conductive portion 77 is blocked.

In the above-described sensor element 101, the circuit of the reference gas adjustment pump cell 90 may be omitted, or the gas sensor 100 does not need to include the power supply circuit 92. For example, in the manufacturing process, the power supply circuit 92 may be connected to the sensor element 101 only at the time of performing the above-described oxygen concentration checking process and the power supply circuit 92 may be not connected at the time of usage of the sensor element 101. Alternatively, the gas sensor 100 does not need to include the control apparatus 95. For example, the gas sensor 100 may include an outer connection connector attached to the lead wires 155 and used to connect the control apparatus 95 and the lead wires 155, instead of the control apparatus 95.

Figure 11:
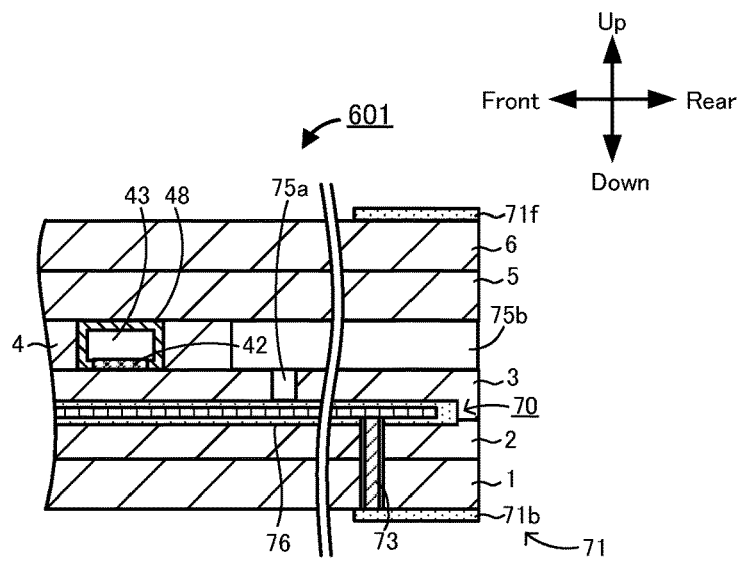
FIG. 11 is a partially cross-sectional view of a sensor element 601 of a modification.

In the above-described embodiment, the sensor element 101 may include the heater 72 and a pressure release hole for the heater insulating layer 74. FIG. 11 is a partially cross-sectional view of a sensor element 601 of a modification in this case. The sensor element 601 has a space 75b that is open to the rear end surface of the sensor element 601 in the first solid electrolyte layer 4 on the rear side of the reference gas chamber 43. In addition, a pressure release hole 75a is formed so as to communicate between the top surface of the heater insulating layer 74 and the space 75b. The pressure release hole 75a is formed as a hole that penetrates the third substrate layer 3. The pressure release hole 75a plays a role in easing an increase in internal pressure due to an increase in temperature in the heater insulating layer 74. Both the space 75b and the pressure release hole 75a do not communicate with the reference gas chamber 43.

In the above-described embodiment, the surface of the front side (a portion exposed to the sensor element chamber 133) of the sensor element 101, including the outer pump electrode 23, may be coated with a porous protective layer made of ceramic, such as alumina.

In the above-described embodiment, the CPU 97 executes a process of feedback control over the voltage Vp2 of the variable power supply 46 such that the voltage V2 becomes a target value V2* and detects a NOx concentration in a measurement-object gas in accordance with a detected value (pump current Ip2) at this time; however, the configuration is not limited thereto. For example, the CPU 97 may control the measurement pump cell 41 (control, for example, the voltage Vp2) such that the pump current Ip2 becomes a constant target value Ip2*, and detect a NOx concentration by using a detected value (voltage V2) at this time. When the measurement pump cell 41 is controlled such that the pump current Ip2 becomes a target value Ip2*, oxygen is pumped out from the third internal cavity 61 at a substantially constant flow rate. Therefore, the oxygen concentration in the third internal cavity 61 varies with the amount of oxygen developed as a result of reduction of NOx in a measurement-object gas in the third internal cavity 61, with the result that the voltage V2 varies. Therefore, the voltage V2 becomes a value corresponding to a NOx concentration in the measurement-object gas. Therefore, the controller 96 is able to calculate a NOx concentration in accordance with the voltage V2. In this case, for example, the correspondence relation between a voltage V2 and a NOx concentration may be stored in the storage section 98 in advance.

In the above-described embodiment, the sensor element 101 detects a NOx concentration in a measurement-object gas; however, as long as the sensor element 101 detects the concentration of specific gas in a measurement-object gas, the configuration is not limited thereto. For example, not limited to a NOx concentration, another oxide concentration may be used as a specific gas concentration. When the specific gas is an oxide, oxygen is produced when the specific gas itself is reduced in the third internal cavity 61 as in the case of the above-described embodiment, so the measurement pump cell 41 is able to detect a specific gas concentration by acquiring a detected value (for example, the pump current Ip2) corresponding to the oxygen.

Alternatively, the specific gas may be a non-oxide, such as ammonia. When the specific gas is a non-oxide, oxygen is produced when the specific gas converted to an oxide (in the case of, for example, ammonia, converted to NO) is reduced in the third internal cavity 61, so the measurement pump cell 41 is able to detect a specific gas concentration by acquiring a detected value (for example, the pump current Ip2) corresponding to the oxygen. For example, when the inner pump electrode 22 in the first internal cavity 20 functions as a catalyst, ammonia can be converted to NO in the first internal cavity 20.

In the above-described embodiment, the element body of the sensor element 101 is a layered body including a plurality of solid electrolyte layers (layers 1 to 6); however, the configuration is not limited thereto. The element body of the sensor element 101 just needs to include at least one oxygen-ion-conductive solid electrolyte layer. For example, the layers 1 to 5 other than the second solid electrolyte layer 6 in FIG. 1 may be a layer made of a material other than a solid electrolyte layer (for example, a layer made of alumina). In this case, the electrodes of the sensor element 101 just need to be disposed on the second solid electrolyte layer 6. For example, the measurement electrode 44 of FIG. 1 just needs to be disposed on the under surface of the second solid electrolyte layer 6. Alternatively, the reference gas chamber 43 just needs to be provided in the spacer layer 5 on the rear side of the measurement-object gas flow portion instead of being provided in the first solid electrolyte layer 4, and the reference electrode 42 just needs to be provided on the under surface of the second solid electrolyte layer 6 in the reference gas chamber 43.

In the above-described embodiment, the inner pump electrode 22 is a cermet electrode of Pt and $ZrO_2$, having an Au content of 1%; however, the configuration is not limited thereto. The inner pump electrode 22 just needs to contain a precious metal (for example, at least any one of Pt, Rh, Ir, Ru, and Pd) having a catalytic activity and a precious metal (for example, Au) having a catalytic activity inhibiting capability that inhibits a catalytic activity for a specific gas, of the precious metal having a catalytic activity. The auxiliary pump electrode 51, as in the case of the inner pump electrode 22, just needs to contain a precious metal having a catalytic activity and a precious metal having a catalytic activity inhibiting capability. The outer pump electrode 23, the reference electrode 42, and the measurement electrode 44 each just need to contain the above-described precious metal having a catalytic activity. Each of the electrodes 22, 23, 42, 44, 51 is desirably a cermet containing a precious metal and an oxide having oxygen ion conductivity (for example, $ZrO_2$); however, one or more of these electrodes may be not a cermet. Each of the electrodes 22, 23, 42, 44, 51 is desirably a porous body; however, one or more of these electrodes may be not a porous body.

In the above-described embodiment, the outer pump electrode 23 serves as an outer main pump electrode that is part of the main pump cell 21 and that is disposed at a portion exposed to a measurement-object gas outside the sensor element 101, an outer auxiliary pump electrode that is part of the auxiliary pump cell 50 and that is disposed at a portion exposed to a measurement-object gas outside the sensor element 101, and an outer measurement electrode that is part of the measurement pump cell 41 and that is disposed at a portion exposed to a measurement-object gas outside the sensor element 101; however, the configuration is not limited thereto. Any one or more of the outer main pump electrode, the outer auxiliary pump electrode, and the outer measurement electrode may be provided outside the sensor element 101 separately from the outer pump electrode 23.

In the above-described embodiment, the controller 96 sets (executes feedback control over) the target value V0* of the voltage V0 in accordance with the pump current Ip1 such that the pump current Ip1 becomes a target value Ip1* and executes feedback control over the pump voltage Vp0 such that the voltage V0 becomes a target value V0*; however, another control may be employed. For example, the controller 96 may execute feedback control over the pump voltage Vp0 in accordance with the pump current Ip1 such that the pump current Ip1 becomes a target value Ip1*. In other words, the controller 96 may directly control the pump voltage Vp0 (by extension, control the pump current Ip0) in accordance with the pump current Ip1 by omitting acquisition of the voltage V0 from the oxygen partial pressure detection sensor cell 80 for main pump control and setting of the target value V0*.

EXAMPLES

Hereinafter, specific examples of a manufactured gas sensor will be described as examples. The present invention is not limited to the following examples.

Example 1

The gas sensor 100 shown in FIG. 1 to FIG. 5 was manufactured according to the above-described manufacturing method and was assumed as Example 1. In manufacturing the sensor element 101, ceramic green sheets were formed such that zirconia particles added with 4 mol % yttria as a stabilizer, an organic binder, a dispersant, a plasticizer, and an organic solvent were mixed and applied to tape casting. The reference electrode 42 was made of a porous cermet electrode of Pt and zirconia. A pattern for the reference electrode 42 was formed by using a paste prepared by mixing Pt powder, zirconia powder, a binder, and a pore-forming material. The electrically conductive portion 77 was made of Pt. A pattern for the electrically conductive portion 77 was formed by using a platinum paste prepared by kneading platinum particles and a solvent. The dense layer 48 was formed by using a paste prepared by mixing alumina powder, an organic binder, a dispersant, a plasticizer, and an organic solvent. A paste for the lead insulating layer 79 was prepared by mixing alumina powder and a binder solution at a weight ratio of 1 to 2. A paste for the bonding layers 9a, 9b was prepared by mixing zirconia particles added with 4 mol % yttria as a stabilizer, an organic binder, and an organic solvent. The porosity of the dense layer 48 was 2.0% and was dense. The porosity of the reference electrode 42 was 15%. The porosity of the electrically conductive portion 77 was 2.0% and was dense. The porosity of the lead insulating layer 79 was 8.0%. Measurement of a porosity was performed by image analysis using the above-described SEM image. A spatial volume other than the reference electrode 42 in the reference gas chamber 43 (the volume of the space surrounded by the dense layer 48 in FIG. 4) was 1.60 mm$^3$. The volume of the reference electrode 42 was 0.028 mm$^3$, and the volume of pores in the reference electrode 42, calculated from the above-described porosity was 0.004 mm$^3$. Therefore, the spatial volume in the reference gas chamber 43 was 1.604 mm$^3$.

Example 2

The gas sensor 100 in which a part around the reference gas chamber was configured as the mode shown in FIG. 9 was prepared and assumed as Example 2. The rear end part of the dense layer 448 in FIG. 9 was formed by laminating green sheets corresponding to the layers 1 to 6 and then, before firing the layered body, filling a paste for the dense layer 448 so as to plug the rear end opening of the reference gas chamber 443. A spatial volume other than the reference electrode 42 in the reference gas chamber 43 (the volume of the space surrounded by the dense layer 48 in FIG. 9) in Example 2 was 27.0 mm$^3$. The volume of the reference electrode 42 was 0.010 mm$^3$, and the porosity was 10%. The volume of pores in the reference electrode 42, calculated from these, was 0.001 mm$^3$. Therefore, the spatial volume in the reference gas chamber 43 was 27.001 mm$^3$. The other points in Example 2 were the same as those of Example 1.

Example 3

Other than the points that a spatial volume other than the reference electrode 42 in the reference gas chamber 43 (the volume of the space surrounded by the dense layer 48 in FIG. 4) was 0.12 mm$^3$, the volume of the reference electrode 42 was 0.030 mm$^3$, the porosity of the reference electrode 42 was 40%, the volume of pores in the reference electrode 42 was 0.012 mm$^3$, and the spatial volume of the reference gas chamber 43 was 0.132 mm$^3$, the gas sensor 100 configured as in the case of Example 1 was prepared and assumed as Example 3.

Example 4

Other than the points that a spatial volume other than the reference electrode 42 in the reference gas chamber 43 (the volume of the space surrounded by the dense layer 48 in FIG. 4) was 0.10 mm$^3$, the volume of the reference electrode 42 was 0.020 mm$^3$, the porosity of the reference electrode 42 was 30%, the volume of pores in the reference electrode 42 was 0.006 mm$^3$, and the spatial volume of the reference gas chamber 43 was 0.106 mm$^3$, the gas sensor 100 configured as in the case of Example 1 was prepared and assumed as Example 4.

Example 5

The gas sensor 100 in which a part around the reference gas chamber was configured as the mode shown in FIG. 7 was prepared and assumed as Example 5. The porous body 49 in Example 5 was formed by using a paste obtained by further adding a pore-forming material (theobromine) to the raw material of a paste for the dense layer 48 of the above-described Example 1. The porosity of the porous body 49 in Example 5 was 30%, and a spatial volume other than the reference electrode 42 in the reference gas chamber 43 (the volume of pores of the porous body 49 in FIG. 7) was 0.16 mm$^3$. The volume of the reference electrode 42 was 0.028 mm$^3$, and the porosity was 15%. The volume of pores in the reference electrode 42, calculated from these, was 0.004 mm$^3$. Therefore, the spatial volume in the reference gas chamber 43 was 0.164 mm$^3$. The other points in Example 5 were the same as those of Example 1.

Example 6

Other than the points that the porosity of the porous body 49 was 20%, a spatial volume other than the reference electrode 42 in the reference gas chamber 43 (the volume of pores of the porous body 49 in FIG. 7) was 0.05 mm$^3$, the volume of the reference electrode 42 was 0.07 mm$^3$, the porosity of the reference electrode 42 was 20%, the volume of pores in the reference electrode 42 was 0.014 mm$^3$, and the spatial volume in the reference gas chamber 43 was 0.064 mm$^3$, the gas sensor 100 configured as in the case of Example 5 was prepared and assumed as Example 6.

Example 7

Other than the points that the porosity of the porous body 49 was 25%, a spatial volume other than the reference electrode 42 in the reference gas chamber 43 (the volume of pores of the porous body 49 in FIG. 7) was 0.004 mm$^3$, the volume of the reference electrode 42 was 0.072 mm$^3$, the porosity of the reference electrode 42 was 30%, the volume of pores in the reference electrode 42 was 0.022 mm$^3$, and the spatial volume in the reference gas chamber 43 was 0.026 mm$^3$, the gas sensor 100 configured as in the case of Example 5 was prepared and assumed as Example 7.

Example 8

Other than the points that the porosity of the porous body 49 was 30%, a spatial volume other than the reference electrode 42 in the reference gas chamber 43 (the volume of pores of the porous body 49 in FIG. 7) was 0.001 mm$^3$, the volume of the reference electrode 42 was 0.010 mm$^3$, the porosity of the reference electrode 42 was 20%, the volume of pores in the reference electrode 42 was 0.002 mm$^3$, and the spatial volume in the reference gas chamber 43 was 0.003 mm$^3$, the gas sensor 100 configured as in the case of Example 5 was prepared and assumed as Example 8.

Example 9

The gas sensor 100 in which a part around the reference gas chamber was configured as the mode shown in FIG. 8 was prepared and assumed as Example 9. A spatial volume other than the reference electrode 42 in the reference gas chamber 43 in Example 9 was 0.12 mm$^3$. The volume of the reference electrode 42 was 0.028 mm$^3$, and the porosity was 15%. The volume of pores in the reference electrode 42, calculated from these, was 0.004 mm$^3$. Therefore, the spatial volume in the reference gas chamber 43 was 0.124 mm$^3$. The other points in Example 9 were the same as those of Example 1.

Comparative Example 1

Figure 12:
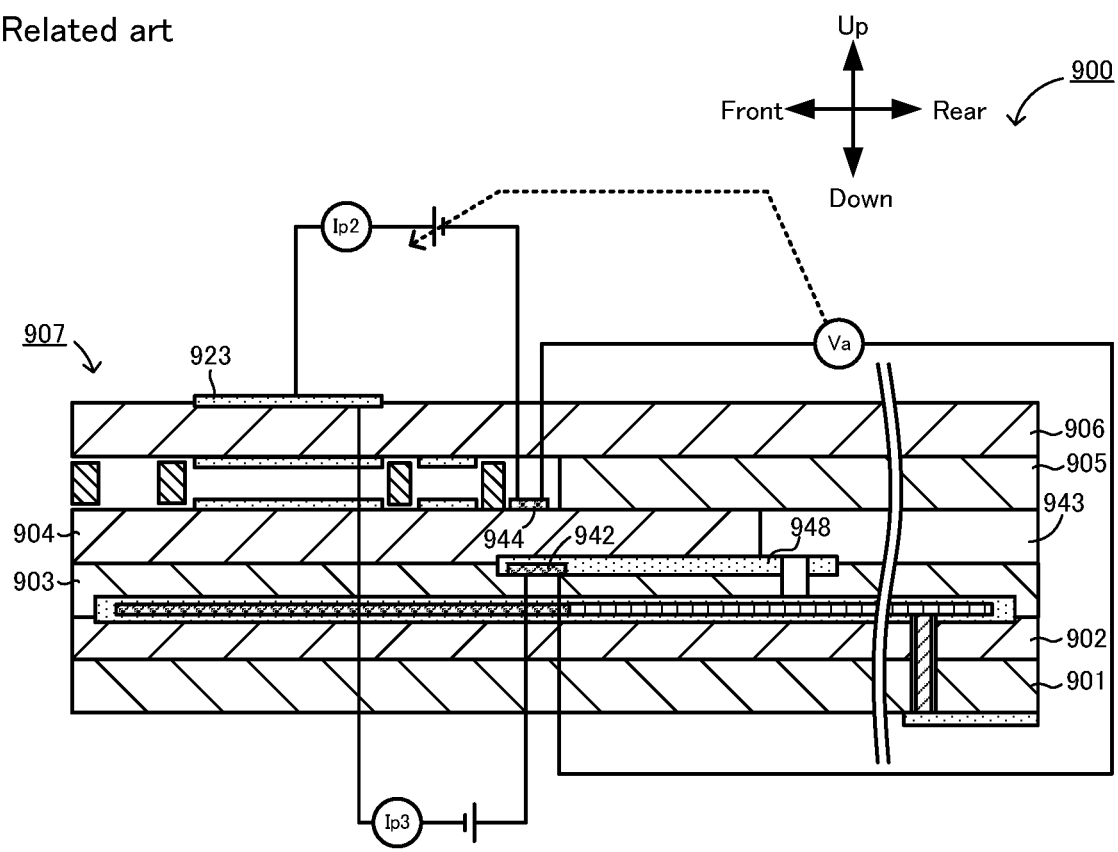
FIG. 12 is a schematic cross-sectional view of a gas sensor 900 of an existing example.

The gas sensor 100 including the sensor element 907 of the existing example shown in FIG. 12 was prepared and assumed as Comparative Example 1. The reference gas inlet layer 948 in Comparative Example 1 was prepared by using the same paste as that for the porous body 49 of Example 6, and the porosity was also 20%, the same as that of Example 6. The volume and porosity of the reference electrode 42 were the same as those of Example 1. The electrically conductive portion 77 was prepared by using the same paste as that of Example 1, and the porosity was also 2.0%, the same as that of Example 1. In Comparative Example 1, as shown in FIG. 12, the reference gas inlet space 943 and the reference gas inlet layer 948 correspond to the reference gas chamber. However, the reference electrode 942 and the outside of the sensor element 907 communicate with each other through the reference gas inlet space 943 and the reference gas inlet layer 948, and the reference gas chamber of Comparative Example 1 is not isolated from the outside of the sensor element 907. The reference gas inlet layer 948 corresponds to the porous body in the reference gas chamber.

Comparative Example 2

Other than the point that the electrically conductive portion 77 was configured to be porous by adding a pore-forming material to a paste for the electrically conductive portion 77, the gas sensor 100 configured as in the case of Example 9 was prepared and assumed as Comparative Example 2. The porosity of the electrically conductive portion 77 was 20.0%.

[Evaluation Test]

The gas sensor 100 of Example 1 was attached to a pipe. Then, the heater 72 was energized to increase the temperature to 850° C. and apply heat to the sensor element 101. In a state where the inside of the pipe was the air atmosphere, the above-described oxygen concentration checking process was performed, and the inside of the reference gas chamber 43 was adjusted to the same oxygen concentration as that of air. Subsequently, a model gas containing nitrogen as a base gas, having an oxygen concentration of 0%, a NOx concentration of 500 ppm, and a gauge pressure of 50 kPa (in other words, the absolute pressure was "atmospheric pressure+50 kPa") was prepared, and the model gas was passed through the pipe as a measurement-object gas. By operating the cells 21, 41, 50, 80 to 83 other than the reference gas adjustment pump cell 90 with the control apparatus 95 in a state where the power supply circuit 92 is not connected to the reference gas adjustment pump cell 90, the gas sensor 100 was placed in a state of continuing measurement of a NOx concentration. This state was maintained for 120 minutes, and the voltage Vref during then was measured. Where the value of the voltage Vref at the start of measurement was 100%, a change in oxygen concentration around the reference electrode 42 was determined to be remarkably small ("A") when the measured voltage Vref had been in a predetermined range (higher than or equal to 80% and lower than or equal to 120%) even after a lapse of 120 minutes. When the measured voltage Vref had been in the predetermined range until a lapse of 60 minutes but it deviated from the predetermined range before a lapse of 120 minutes, it was determined that a change in oxygen concentration around the reference electrode 42 was considerably small ("B"). When the measured voltage Vref had been in the predetermined range until a lapse of 30 minutes but it deviated from the predetermined range before a lapse of 60 minutes, it was determined that a change in oxygen concentration around the reference electrode 42 was small ("C"). When the measured voltage Vref deviated from the predetermined range before a lapse of 30 minutes, it was determined that a change in oxygen concentration around the reference electrode 42 was large ("F"). The gas sensors 100 of Examples 2 to 9 and Comparative Examples 1 and 2 were similarly subjected to evaluation test. In any of Examples 6 to 9 and Comparative Examples 1 and 2 of which the evaluations were lower than or equal to B, the voltage Vref deviated from the predetermined range so as to be lower than the predetermined range. In other words, in any of Examples 6 to 9 and Comparative Examples 1 and 2, it was observed that the oxygen concentration in the reference electrode 42 had a tendency to decrease with time, and the oxygen concentration did not increase over the predetermined range.

The modes and various numeric values of Examples 1 to 9 and Comparative Examples 1 and 2 and the results of evaluation tests are shown in Table 1 together. In Table 1, "Spatial Volume in Reference Gas Chamber (other than Reference Electrode)", "Volume of Pores in Reference Electrode", and "Spatial Volume in Reference Gas Chamber" for Comparative Example 1 are not shown.

TABLE 1

| | Reference gas chamber | Dense layer of inner peripheral surface of reference gas chamber | Porous body in reference gas chamber | Porosity of porous body [%] | Spatial volume in reference gas chamber (other than reference electrode) [mm³] | Volume of reference chamber [mm³] | Porosity of reference electrode [%] | Volume of pores in reference electrode [mm³] | Spatial volume in reference gas chamber [mm³] | Reference electrode lead | Evaluation |
|---|---|---|---|---|---|---|---|---|---|---|---|
| Example 1 | Isolated | Present | Not present | — | 1.60 | 0.028 | 15 | 0.004 | 1.604 | Dense | A |
| Example 2 | Isolated | Present | Not present | — | 27.0 | 0.010 | 10 | 0.001 | 27.001 | Dense | A |
| Example 3 | Isolated | Present | Not present | — | 0.12 | 0.030 | 40 | 0.012 | 0.132 | Dense | A |
| Example 4 | Isolated | Present | Not present | — | 0.10 | 0.020 | 30 | 0.006 | 0.106 | Dense | A |
| Example 5 | Isolated | Not present | Present | 30 | 0.16 | 0.028 | 15 | 0.004 | 0.164 | Dense | A |
| Example 6 | Isolated | Not present | Present | 20 | 0.05 | 0.070 | 20 | 0.014 | 0.064 | Dense | B |
| Example 7 | Isolated | Not present | Present | 25 | 0.004 | 0.072 | 30 | 0.022 | 0.026 | Dense | B |
| Example 8 | Isolated | Not present | Present | 30 | 0.001 | 0.010 | 20 | 0.002 | 0.003 | Dense | C |
| Example 9 | Isolated | Not present | Not present | — | 0.12 | 0.028 | 15 | 0.004 | 0.124 | Dense | C |
| Comparative Example 1 | Communicate with outside | Not present | Present | 20 | — | 0.028 | 15 | — | — | Dense | F |
| Comparative Example 2 | Isolated | Not present | Not present | — | 0.12 | 0.028 | 15 | 0.004 | 0.124 | Porous | F |

As shown in Table 1, for any one of Examples 1 to 9 in which the reference gas chamber 43 was provided inside the sensor element in an isolated form and the electrically conductive portion 77 was densely formed, the evaluation was higher than or equal to C, and a change in oxygen concentration around the reference electrode 42 was small. In contrast, for any one of Comparative Example 1 in which the reference gas chamber is not isolated from the outside of the sensor element 907 and the reference electrode 42 communicates with the outside of the sensor element and Comparative Example 2 in which the electrically conductive portion 77 is porous, the evaluation was F. In the evaluation tests, it is presumable that, since the oxygen concentration of the model gas is 0% and the pressure is higher than atmospheric pressure, the model gas slightly enters the space 149 and the oxygen concentration in the space 149 is lower than the oxygen concentration in air. In Comparative Example 1, it is presumable that, since the space 149 and the reference electrode 942 communicate with each other via the reference gas inlet space 943 and the reference gas inlet layer 948, the oxygen concentration around the reference electrode 942 is decreased and the evaluation is F. In Comparative Example 2 as well, it is presumable that, since the space 149 and the reference gas chamber 43 communicate with each other via the porous electrically conductive portion 77, the oxygen concentration in the reference gas chamber 43 is decreased and the evaluation is F. In contrast, in Examples 1 to 9, it is presumable that, since entry and exit of oxygen to and from the reference gas chamber 43 are suppressed, the oxygen concentration in the reference gas chamber 43 is less likely to decrease and the evaluation is higher than or equal to C. For any one of Examples 1 to 4 in the modes including the dense layer 48, the evaluation was A. From the results of Examples 1 to 4, it is presumable that the spatial volume in the reference gas chamber 43 in the mode including the dense layer 48 is desirably greater than or equal to 0.106 mm³. In Examples 5 to 8 in the modes including the porous body 49, such a tendency was observed that a change in oxygen concentration around the reference electrode 42 was suppressed as the spatial volume in the reference gas chamber 43 increased. From the results of Examples 5 to 8, it is presumable that the spatial volume in the reference gas chamber 43 in the mode including the porous body 49 is desirably greater than or equal to 0.026 mm³ and more desirably greater than or equal to 0.164 mm³.

What is claimed is:

1. A sensor element for detecting a specific gas concentration in a measurement-object gas, the sensor element comprising:
    an element body including an oxygen-ion-conductive solid electrolyte layer, and having inside a measurement-object gas flow portion that introduces and flows the measurement-object gas and a reference gas chamber used to store a reference gas that is a reference for detecting the specific gas concentration;
    a reference electrode disposed in the reference gas chamber; and
    an electrically conductive portion including a reference electrode terminal disposed on an outer side of the element body and a reference electrode lead portion that provides electrical continuity between the reference electrode terminal and the reference electrode,
    wherein the reference gas chamber is provided inside the element body in an isolated form so as not to communicate with an outside of the element body or the measurement-object gas flow portion, and
    at least part of the electrically conductive portion is densely formed so as to block movement of oxygen between the reference gas chamber and the outside of the element body via the electrically conductive portion.

2. The sensor element according to claim 1, further comprising:
    a dense layer covering at least part of a portion made up of the solid electrolyte layer on an inner peripheral surface of the reference gas chamber and having no oxygen ion conductivity.

3. The sensor element according to claim 2,
    wherein a spatial volume in the reference gas chamber is greater than or equal to 0.106 mm³.

4. The sensor element according to claim 1, further comprising:
    a porous body filled in the reference gas chamber and having no oxygen ion conductivity.

5. The sensor element according to claim 4,
    wherein a spatial volume in the reference gas chamber is greater than or equal to 0.026 mm³.

6. The sensor element according to claim 4,
wherein a spatial volume in the reference gas chamber is greater than or equal to 0.164 mm$^3$.

7. The sensor element according to claim 4,
wherein a porosity of the porous body is higher than or equal to 20% and less than or equal to 30%.

8. A gas sensor comprising the sensor element according to claim 1.

* * * * *